US012559372B2

(12) United States Patent
Nagasaka et al.

(10) Patent No.: US 12,559,372 B2
(45) Date of Patent: Feb. 24, 2026

(54) METHOD AND DEVICE FOR PRODUCING PHOSPHORUS

(71) Applicant: TOHOKU UNIVERSITY, Sendai (JP)

(72) Inventors: Tetsuya Nagasaka, Sendai (JP); Takahiro Miki, Sendai (JP); Kazuyo Matsubae, Sendai (JP); Yasushi Sasaki, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 869 days.

(21) Appl. No.: 17/789,051

(22) PCT Filed: Oct. 9, 2020

(86) PCT No.: PCT/JP2020/038397
    § 371 (c)(1),
    (2) Date: Jun. 24, 2022

(87) PCT Pub. No.: WO2021/131231
    PCT Pub. Date: Jul. 1, 2021

(65) Prior Publication Data
    US 2023/0038150 A1      Feb. 9, 2023

(30) Foreign Application Priority Data
    Dec. 27, 2019     (JP) ................................. 2019-238375

(51) Int. Cl.
    *C01B 25/02*          (2006.01)
    *B01J 8/02*           (2006.01)
(52) U.S. Cl.
    CPC ............. *C01B 25/02* (2013.01); *B01J 8/0278* (2013.01); *B01J 8/0285* (2013.01); *B01J 8/0292* (2013.01); *B01J 2208/027* (2013.01)

(58) Field of Classification Search
    CPC ........ C01B 25/02; C01B 25/12; B01J 8/0278; B01J 8/0285; B01J 8/0292; B01J 2208/027
    See application file for complete search history.

(56) References Cited

U.S. PATENT DOCUMENTS 6,207,024 B1     3/2001  Severns

FOREIGN PATENT DOCUMENTS

CN          1291167 A      4/2001
DE    102016011287 A1 *   1/2017    ............. C01B 25/12
                  (Continued)

OTHER PUBLICATIONS

Alnaimat et al., "Transient analysis of direct contact evaporation and condensation within packed beds" International Journal of Heat and Mass Transfer 54, May 2011, 3381-3393 (Year: 2011).*
(Continued)

*Primary Examiner* — Anthony J Zimmer
*Assistant Examiner* — Abdul-Rahman Yusuf Waleed Smari
(74) *Attorney, Agent, or Firm* — Sughrue Mion, PLLC

(57) ABSTRACT

A method for producing phosphorus in which a reaction for forming gaseous phosphorus (g) by bringing phosphorus oxide generated by heating a liquid phosphoric acid compound into contact with a carbon material to reduce the phosphorus oxide and for condensing the gaseous phosphorus (g) to obtain liquid phosphorus (L) is conducted by a flow reaction with a nonoxidizing gas flow, wherein the reduction reaction of the phosphorus oxide is conducted in a carbon material-packed bed, and the condensation of the formed gaseous phosphorus (g) is substantially conducted in a condensation accelerator-packed bed which is disposed downstream of the carbon material-packed bed in contact with the carbon material-packed bed.

12 Claims, 6 Drawing Sheets

(56)           References Cited

FOREIGN PATENT DOCUMENTS

| JP | 2019-019029 | A | 2/2019 |
|----|-------------|-----|--------|
| JP | 6464491 | B2 | 2/2019 |
| MX | PA00008399 | A | 7/2001 |
| WO | 99/43612 | A1 | 9/1999 |
| WO | 01/25147 | A1 | 4/2001 |
| WO | 2010/029570 | A1 | 3/2010 |

OTHER PUBLICATIONS

Japanese Office Action for JP 2021-523088 dated Jul. 20, 2021.
International Search Report for PCT/JP2020/038397 dated Dec. 15, 2020.
Communication issued May 1, 2025 by Korean Patent Office in Korean Patent Application No. 10-2022-7023012.
Extended European Search Report issued May 28, 2024 by European Patent Office in Application No. 20906937.6.

* cited by examiner

[FIG. 1]
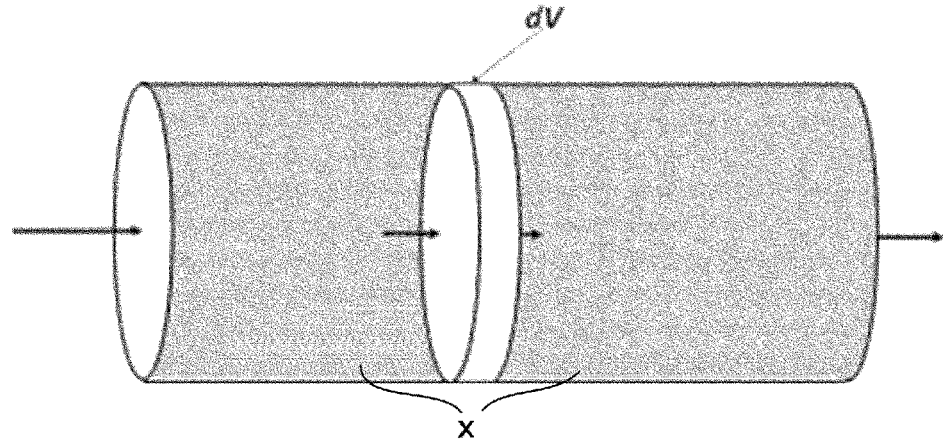
[FIG. 2]
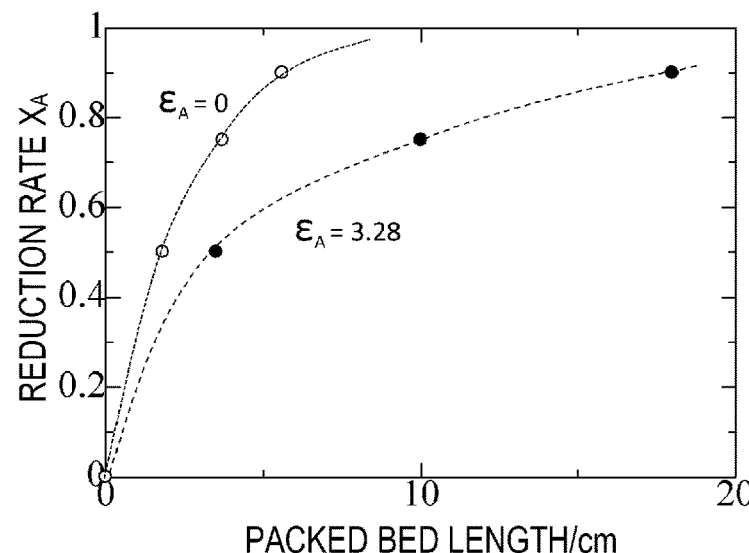
[FIG. 3]
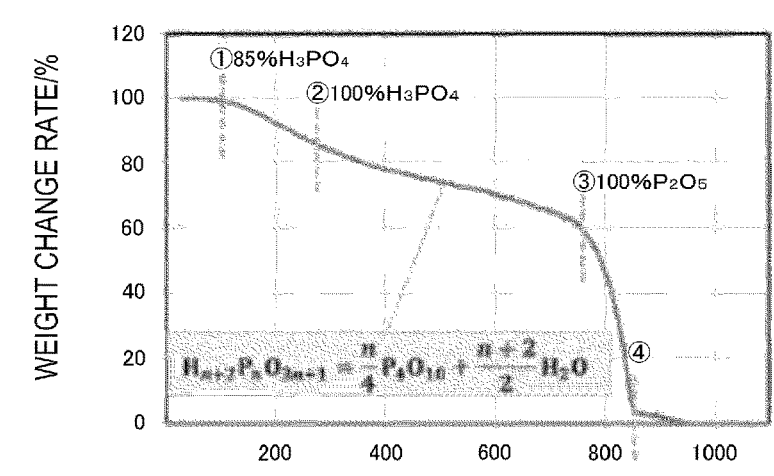

[FIG. 4]
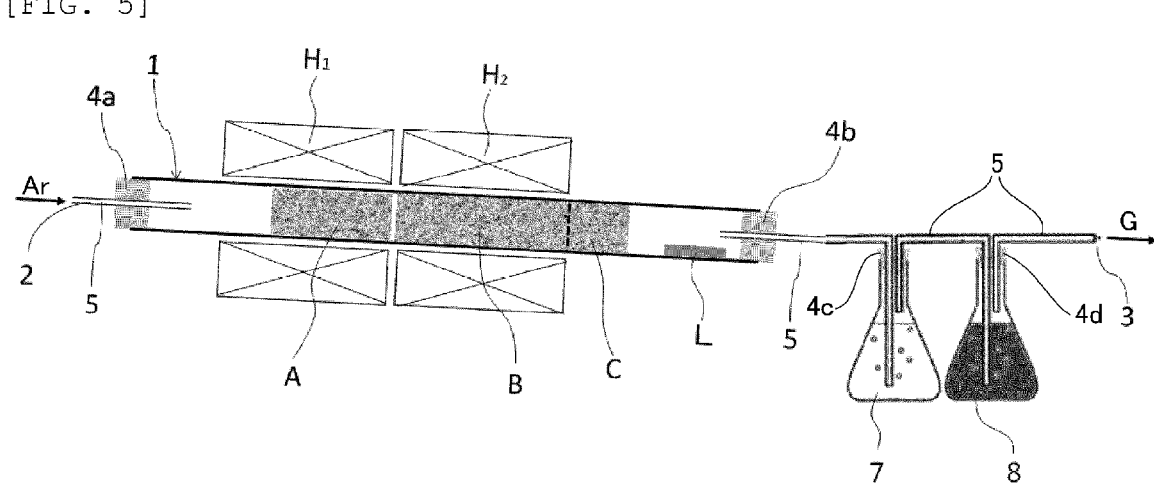
[FIG. 5]

[FIG. 6]
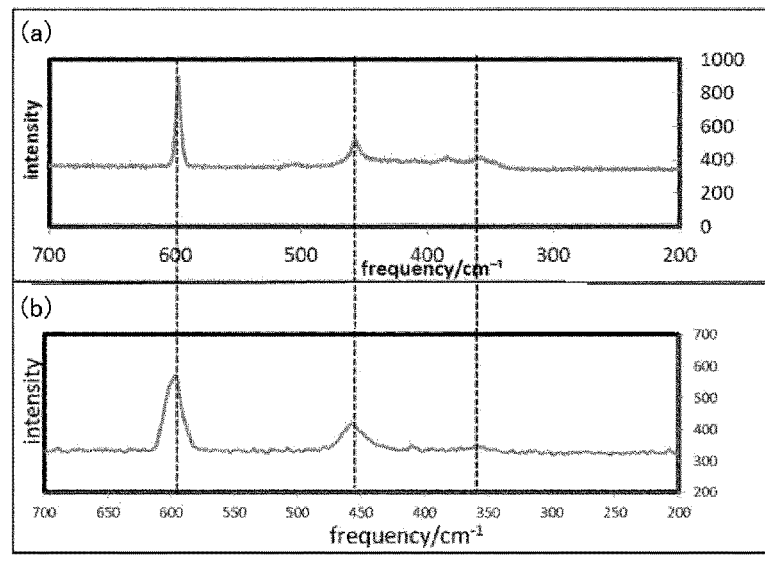
[FIG. 7]
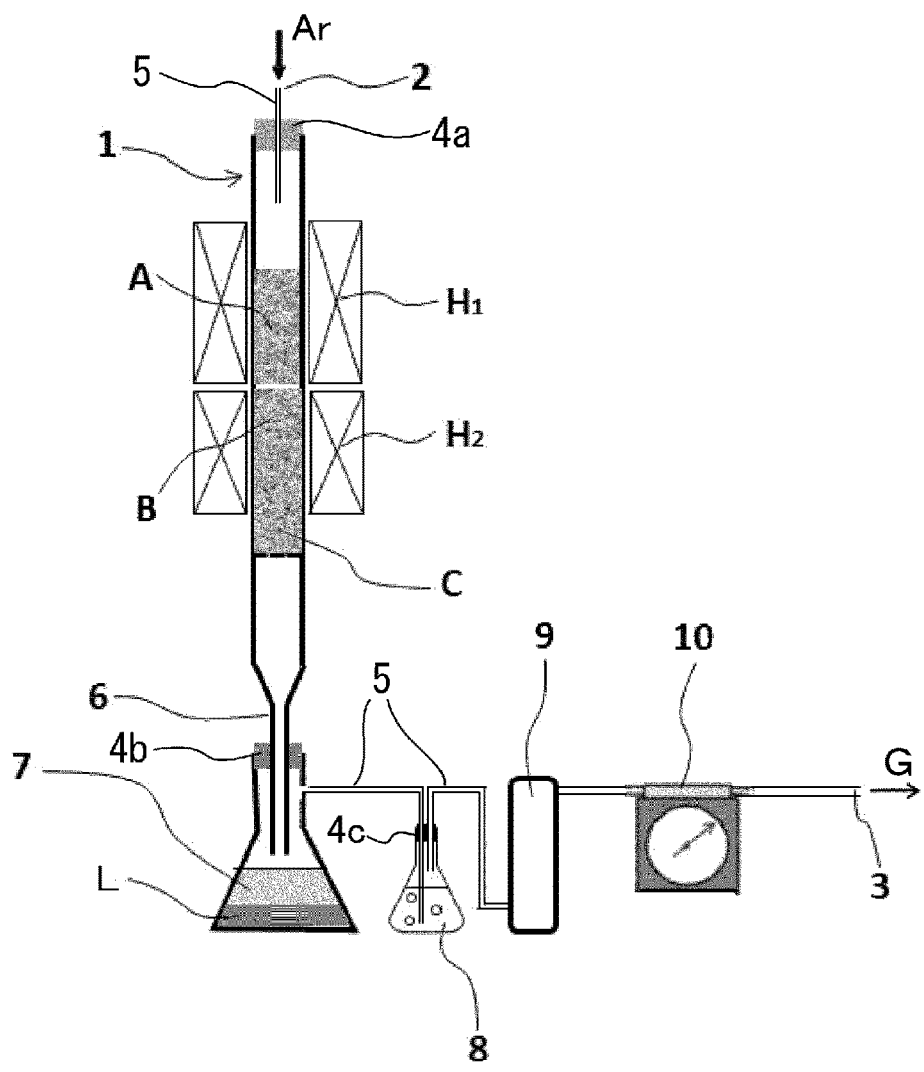

[FIG. 8]
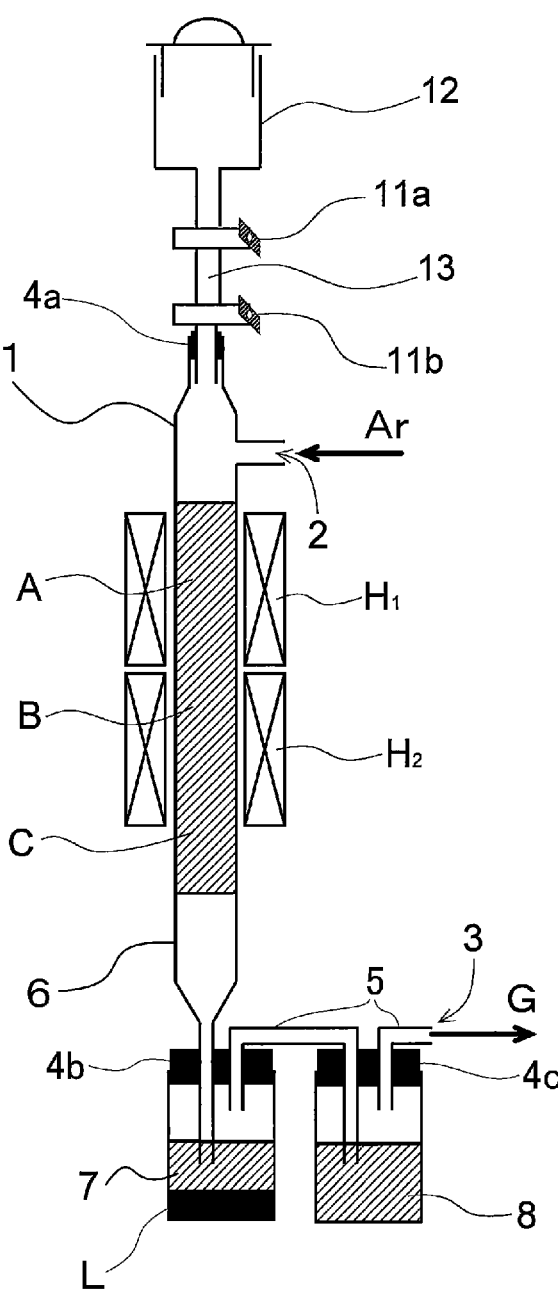

[FIG. 9]
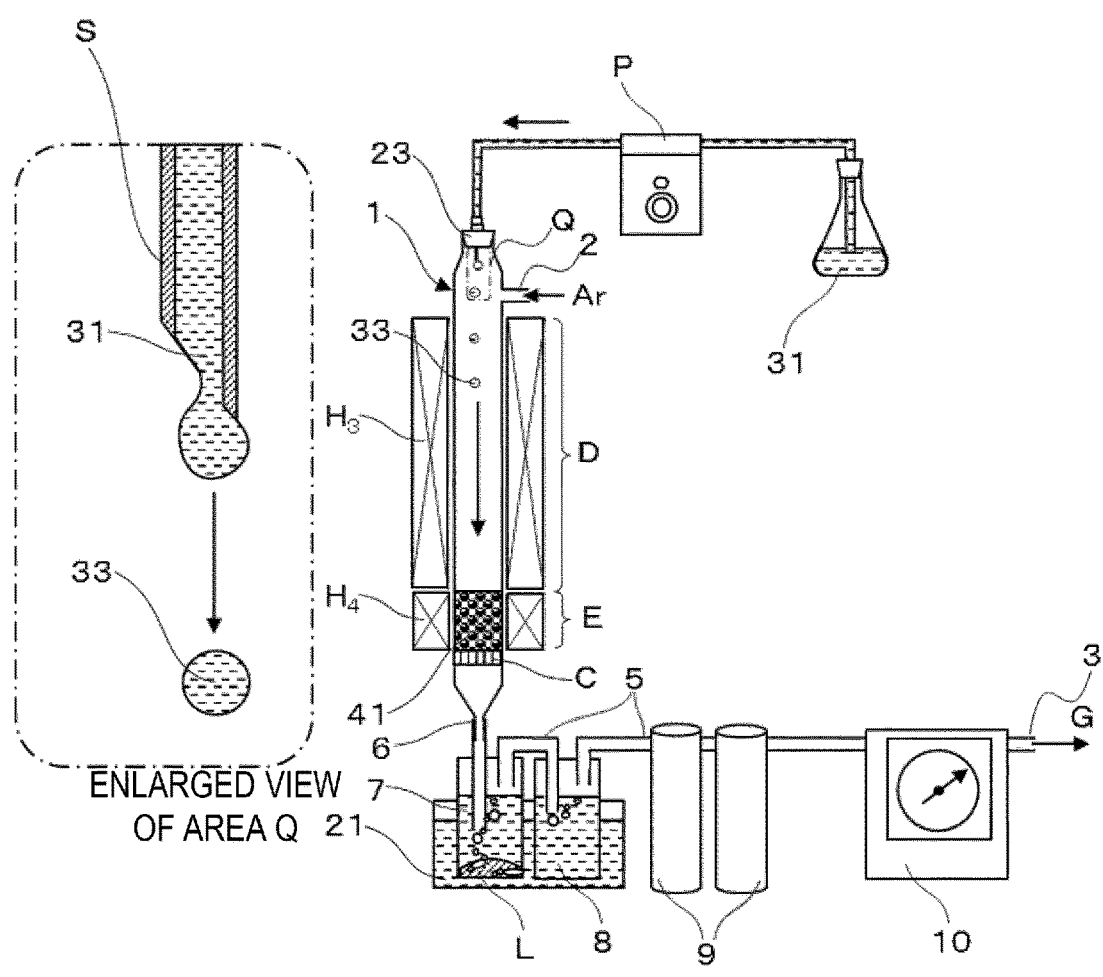
ENLARGED VIEW
OF AREA Q
[FIG. 10]
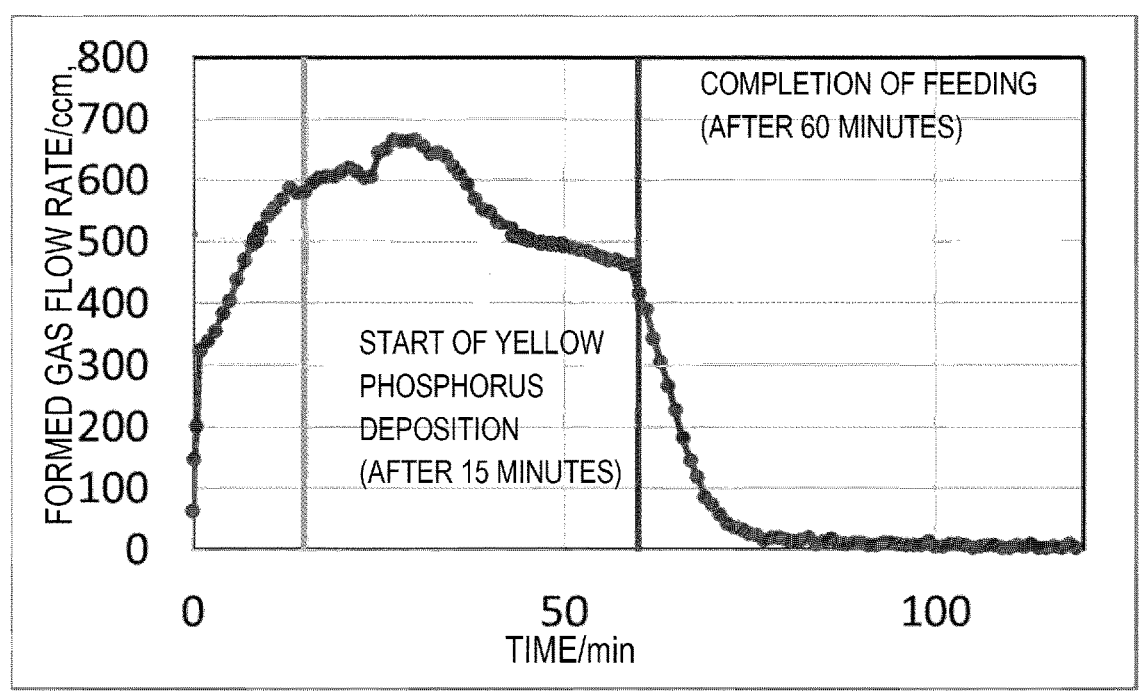

[FIG. 11]
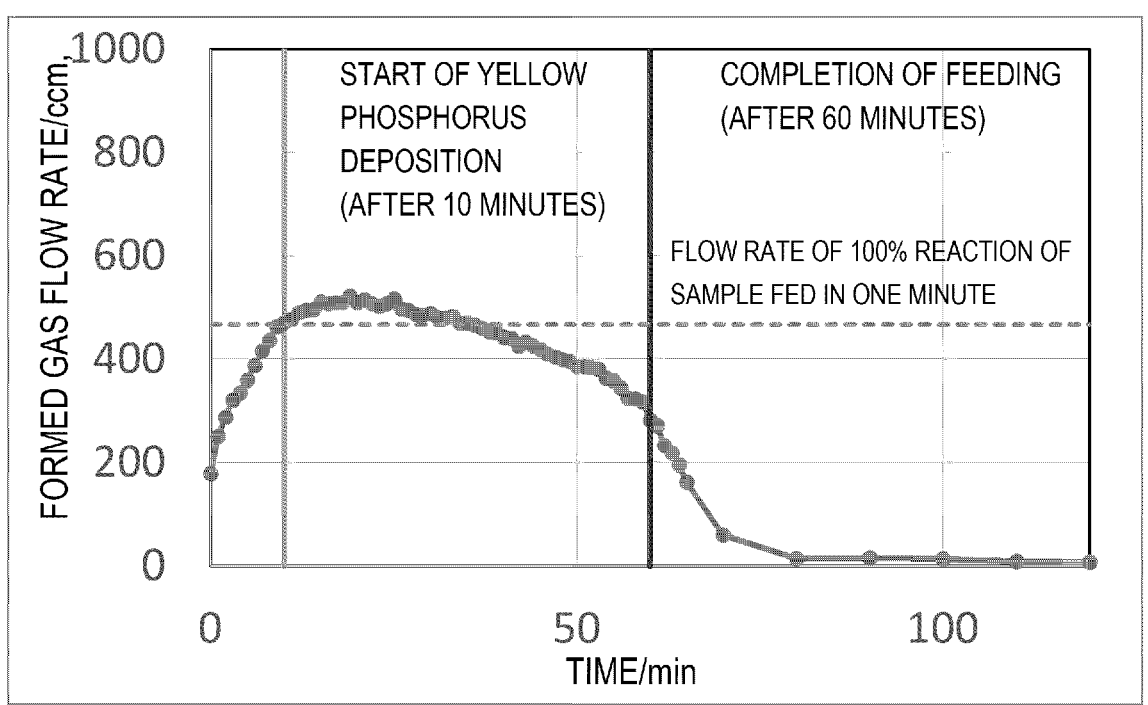

METHOD AND DEVICE FOR PRODUCING PHOSPHORUS

CROSS REFERENCE TO RELATED APPLICATIONS

This application is a National Stage of International Application No. PCT/JP2020/038397 filed Oct. 9, 2020, claiming priority based on Japanese Patent Application No. 2019-238375 filed Dec. 27, 2019.

TECHNICAL FIELD

The present invention relates to a method for producing liquid phosphorus (abbreviated to as phosphorus or P below) from a liquid phosphoric acid compound as a starting raw material and to a device for carrying out the method. More specifically, the invention relates to a method for heating a phosphoric acid compound, generating gaseous phosphorus (vapor) by bringing the generated phosphorus oxide into contact with a solid (solid phase) carbon material to reduce the phosphorus oxide and then condensing the gaseous phosphorus to obtain liquid phosphorus (liquid phase) and to a device for carrying out the method.

BACKGROUND ART

Phosphorus is an essential element for agriculture, and there is no replacement for phosphorus in food production. Phosphorus is also used as an important material in a wide range of industrial fields such as electronic parts (semiconductors, cathode materials for secondary cells and the like), automobiles (steel plate surface treatment solutions, secondary cell electrolytes and the like), pharmaceutical products (osteoporosis-treating agents), foods (antioxidants and emulsifiers) and plastics (flame retardants and stabilizers). Phosphorus which is currently produced almost entirely depends on naturally produced phosphorus ores, but high-quality phosphorus ores which have high quality and which are easy to mine have been recently depleted rapidly. Low-quality phosphorus ores contain high amounts of harmful heavy metals such as Cd and As and natural radioactive substances such as $^{238}$U and $^{232}$Th. Thus, there are concerns about accumulation of harmful substances in the agricultural land from phosphorus ores through fertilizer, and the use thereof also has serious problems.

To cope with the depletion of phosphorus ores to be faced in the near future, phosphorus is retained as a strategic material by the producer countries, including the United States, which bans the export of phosphorus since 1997, and our country has an increasing difficulty in importing phosphorus year by year. Here, phosphorus is contained in iron ores that our country imports. The phosphorus components (phosphorus elements) in iron ores move to steel making slag in the end, and the total amount thereof is equal to the amount of phosphorus components imported as phosphorus ores. Moreover, the phosphorus components contained in foods and the like accumulate in sewage sludge, but the phosphorus components are not effectively utilized, either. When the unused phosphorus components can be recovered, the depletion of phosphorus ores can be coped with, and domestic self-sufficiency of phosphorus may become possible.

Phosphorus can be obtained, for example, as a reaction intermediate when phosphoric acid is obtained from a phosphorus ore by a dry process. That is, in the dry process, phosphoric acid is produced by heating a phosphorus ore to 1300 to 1600° C. in an electric furnace for smelting reduction to generate a gas of phosphorus ($P_4$), cooling and collecting the gas with a water scrubber and further reacting the obtained phosphorus and water. By the dry process, high-purity phosphorus is obtained by the smelting reduction of a phosphorus ore. However, a high-temperature reaction is required, and electric power of about three hundred million kilowatt-hours is required for producing about twenty thousand tons of phosphorus that our country consumes each year.

While a phosphorus ore contains phosphorus components at 10% or more, the phosphorus components contained in steel making slag or sewage sludge are at several percent or less. Thus, direct use thereof as a raw material for a phosphorus production process is inefficient and cannot be realized economically as a process for practical use. Therefore, it is considered to concentrate and recover the phosphorus components in sewage sludge or steel slag as crude phosphoric acid and to produce phosphorus ($P_4$) from the phosphoric acid ($H_3PO_4$ or $H_3PO_3$). Reduction of phosphoric acid to phosphorus does not require melting of an ore containing high amounts of impurities, and high-purity phosphorus is obtained. Moreover, reduction at a lower temperature is possible, and thus the electric power energy (in other words, the production costs) can be cut drastically. When the phosphorus components in sewage sludge or steel slag can be recovered and effectively utilized in this manner, a certain amount of phosphorus can be supplied domestically. That is, the amount of imported phosphorus ores, which is currently entirely dependent on imports and thus has serious concerns about resource supply, can be cut largely.

As a method for obtaining phosphorus by reducing phosphoric acid, a method using a carbon material is known. For example, techniques described in PTLs 1 to 3 below have been proposed.

For example, U.S. Pat. No. 6,207,024 (PTL 1) proposes a method for producing phosphorus through carbon reduction of phosphoric acid according to the reaction equation (1) below.

$$4H_3PO_4+16C \rightarrow 6H_2+16CO+P_4 \qquad (1)$$

PTL 1 states that reduction is possible by applying microwaves to a mixture of phosphoric acid and carbon and heating at a temperature of 430 to 650° C., but specific disclosure thereof is limited to only show the decrease in mass of the mixture of phosphoric acid and carbon as the reducing agent. The product has not been analyzed, and PTL 1 does not disclose any proof that phosphorus was obtained by the reduction. The water gas reaction rate (the reaction rate of a water gas shift reaction) at which water vapor and carbon react with each other is extremely low at a reaction temperature of 650° C. or lower, and most of the generated water vapor remains unreacted and may react with formed phosphorus vapor and be re-oxidized to generate $P_4O_{10}$ (also called $P_2O_5$). Furthermore, because the vaporization of phosphoric acid and the reduction of vaporized phosphoric acid take place in the same area in this system, regulation and optimization of both reactions are difficult, and there are great difficulties for industrialization practical application.

WO2010/029570 (PTL 2) discloses a method of feeding a mixture of phosphoric acid and carbon powder into a cylindrical reactor made of graphite, further adding carbon powder on the mixture, then heating the reactor downward from an upper part with a heating burner, causing a reaction between carbon and phosphoric acid to generate gaseous phosphorus and introducing the gaseous phosphorus into water for recovery. It is described that the reaction started at 850° C. and that 8.7 g of phosphorus was recovered from 68 g of 85% phosphoric acid and 100 g of carbon powder. PTL 2, however, does not clearly describe that phosphoric acid in the raw material is vaporized for carbon reduction and does not describe the vaporization temperature and the reduction temperature of phosphorus oxide. Moreover, the area for the vaporization of phosphoric acid and the area for the reduction reaction are not separated in the system of PTL 2, and thus the system has similar problems as those of PTL 1.

JP-A-2019-19029 (PTL 3) proposes a method of bringing phosphorus oxide vaporized by heating activated carbon containing phosphoric acid into contact with a carbon material to reduce the phosphorus oxide, leading the formed phosphorus in a gas form (in the invention, abbreviated to as phosphorus (g) and also called gaseous phosphorus) into a water tank to bring the phosphorus into contact with water and thus recovering phosphorus in a liquid form (in the invention, abbreviated to as phosphorus (L) and also called phosphorus as liquid or liquid phosphorus). In PTL 3, formation of phosphorus through the reduction reaction of phosphoric acid with carbon was observed at a temperature of 850° C. to 950° C. However, the phosphorus was not trapped in the water tank, and the product only adhered on the wall surface at the outlet side in the reaction tube. The adhered material was composed of a mixture of orange and white substances, in which the orange deposits were identified as phosphorus by Raman spectroscopy and in which the white deposits were speculated to be the unreacted polyphosphoric acid compound. Because it is not easy to separate polyphosphoric acid and phosphorus in a mixture, it is desired to suppress the deposition of the polyphosphoric acid compound, but the reaction conditions and the like for recovering the phosphorus only without deposition of the polyphosphoric acid compound are not described.

CITATION LIST

Patent Literature

PTL 1: U.S. Pat. No. 6,207,024
PTL 2: WO2010/029570
PTL 3: JP-A-2019-19029

SUMMARY OF INVENTION

Technical Problem

Although methods for producing phosphorus through reduction of phosphoric acid with a carbon material are described in PTLs 1 to 3 above, further improvement is required in view of industrial practical application, namely for stably obtaining high-purity liquid phosphorus (L).

A problem of the invention is to provide a method for quantitatively stably producing high-purity liquid phosphorus (L) from a liquid phosphoric acid compound as a starting raw material and a device for carrying out the method.

Solution to Problem

The present inventors have investigated a method for producing phosphorus by reducing phosphorus oxide generated by heating a phosphoric acid compound, for example, phosphorus oxide such as $P_4O_{10}$ ($P_2O_5$), with a carbon material at a high temperature and recovering phosphorus stably at a high yield as a liquid. As a result, the inventors have found that high-purity phosphorus (L) is obtained highly efficiently, by a reaction for forming gaseous phosphorus (g) by bringing phosphorus oxide generated by heating a liquid phosphoric acid compound into contact with a carbon material to reduce the phosphorus oxide and for condensing the gaseous phosphorus (g) to obtain liquid phosphorus (L) which is conducted by a flow reaction with a nonoxidizing gas flow, when the reduction reaction of the phosphorus oxide is conducted in a carbon material-packed bed, for example, by regulating the generated gas volume, and when the subsequent condensation of the phosphorus (g) is substantially conducted in a condensation accelerator-packed bed which is disposed downstream of the carbon material-packed bed in contact with the carbon material-packed bed.

The invention has been completed based on the findings.

That is, the problem has been solved by the following means.

[1] A method for producing phosphorus in which a reaction for forming gaseous phosphorus (g) by bringing phosphorus oxide generated by heating a liquid phosphoric acid compound into contact with a carbon material to reduce the phosphorus oxide and for condensing the gaseous phosphorus (g) to obtain liquid phosphorus (L) is conducted by a flow reaction with a nonoxidizing gas flow, wherein the reduction reaction of the phosphorus oxide is conducted in a carbon material-packed bed, and the condensation of the formed gaseous phosphorus (g) is substantially conducted in a condensation accelerator-packed bed which is disposed downstream of the carbon material-packed bed in contact with the carbon material-packed bed.

[2] The method for producing phosphorus described in [1], wherein the liquid phosphorus (L) is obtained by continuously or discontinuously supplying the liquid phosphoric acid compound.

[3] The method for producing phosphorus described in [1] or [2], wherein the liquid phosphoric acid compound is supplied in a state of being soaked in a porous carrier.

[4] The method for producing phosphorus described in [1] or [2], wherein the liquid phosphoric acid compound is supplied by dropping.

[5] The method for producing phosphorus described in any of [1] to [4], wherein the liquid phosphoric acid compound is heated to 200 to 1000° C. to generate the phosphorus oxide, and the reduction reaction temperature of the phosphorus oxide is 700 to 1200° C.

[6] The method for producing phosphorus described in any of [1] to [5], wherein the condensation temperature in the condensation accelerator-packed bed is in a temperature range of 44° C. or higher and lower than 280° C. or in a temperature range in which the phosphorus (g) substantially condenses.

[7] The method for producing phosphorus described in any of [1] to [6], wherein the liquid phosphoric acid compound contains at least one kind of crude phosphoric acid, crude condensed phosphoric acid and crude phosphorous acid.

[8] The method for producing phosphorus described in any of [1] to [7], wherein the heating temperature of the liquid phosphoric acid compound and the reduction reaction temperature of the phosphorus oxide are independently regulated.

[9] The method for producing phosphorus described in any of [1] to [8], wherein the reduction reaction of the phosphorus oxide is conducted in the carbon material-packed bed by regulating at least one of the heating temperature of the liquid phosphoric acid compound and the nonoxidizing gas flow rate based on the total discharged gas flow rate of carbon monoxide gas and hydrogen gas generated through the reduction reaction of the phosphorus oxide.

[10] The method for producing phosphorus described in any of [1] to [9], wherein unreacted phosphorus oxide is recovered in a container holding water disposed downstream of the condensation accelerator-packed bed in the reduction reaction of the phosphorus oxide.

[11] The method for producing phosphorus described in any of [1] to [10], wherein the carbon material is supplied to the carbon material-packed bed at each predetermined time depending on the amount of decrease in the carbon material in the carbon material-packed bed due to the reduction reaction of the phosphorus oxide.

[12] A device for producing phosphorus for obtaining liquid phosphorus (L) from a liquid phosphoric acid compound as a starting raw material by a flow reaction with a nonoxidizing gas flow, comprising a phosphoric acid compound-heating area for heating the liquid phosphoric acid compound to generate phosphorus oxide, a carbon material-packed bed area for reducing the phosphorus oxide generated in the phosphoric acid compound-heating area to form gaseous phosphorus (g) and a condensation accelerator-packed bed area for condensing the gaseous phosphorus (g) generated in the carbon material-packed bed area to generate liquid phosphorus (L), in this order from upstream to downstream.

[13] The device for producing phosphorus described in [12], wherein the liquid phosphoric acid compound is continuously or discontinuously supplied to the phosphoric acid compound-heating area.

[14] The device for producing phosphorus described in [12] or [13], wherein the condensation of the gaseous phosphorus (g) is substantially conducted in the condensation accelerator-packed bed area.

[15] The device for producing phosphorus described in any of [12] to [14], further comprising means for supplying the carbon material to the carbon material-packed bed at each predetermined time depending on the amount of decrease in the carbon material in the carbon material-packed bed.

[16] The device for producing phosphorus described in any of [12] to [15], further comprising means capable of regulating feeding of the phosphoric acid compound in such a manner that the generated gas flow rate falls in a certain regulation range.

[17] The device for producing phosphorus described in any of [12] to [16], comprising a regulator which automatically regulates at least one of supply of the phosphoric acid compound by dropping of the phosphoric acid compound or as a porous carrier impregnated with the phosphoric acid compound, regulation of heating of the supplied phosphoric acid compound, the volume of the gas generated through the reduction reaction and the recovery amount of the liquid phosphorus.

In the invention, (g) after the name of a compound or a rational formula indicates gas, and (L) indicates liquid. For example, phosphorus (g) indicates phosphorus in a gas form, and phosphorus (L) indicates phosphorus as liquid.

The terms "upstream" and "downstream" in the invention are used in the direction of the flow of the nonoxidizing gas. That is, the side from which the nonoxidizing gas flows in is the upstream, and the side to which the nonoxidizing gas flows out is the downstream.

That "the reduction reaction of the phosphorus oxide is conducted in a carbon material-packed bed" in the invention means that the phosphorus oxide generated by heating a liquid phosphoric acid compound is reduced in a carbon material-packed bed as much as possible. As described below, theoretically, the reduction rate increases as the packed bed length increases, but the length is difficult to increase to a predetermined length or longer considering the costs and the like. Thus, 70% or more of the phosphorus oxide generated by heating the liquid phosphoric acid compound is preferably reduced in the carbon material-packed bed, which means that the reduction rate of the phosphorus oxide is preferably 70% or more. More preferably 90% or more, further preferably 95% or more, further preferably 97% or more, further preferably 99% or more is desirably reduced in the carbon material-packed bed.

That the "condensation" is "substantially conducted in a condensation accelerator-packed bed" in the invention means that the gaseous phosphorus (g) generated by bringing the phosphorus oxide into contact with the carbon material constituting the carbon material-packed bed to reduce the phosphorus oxide is substantially condensed in the condensation accelerator-packed bed into a liquid. The term "substantially" means that preferably 90 mass % or more, more preferably 95 mass % or more, further preferably 97 mass % or more, further preferably 99 mass % or more of the gaseous phosphorus (g) generated by bringing the phosphorus oxide into contact with the carbon material to reduce the phosphorus oxide is condensed in the condensation accelerator-packed bed. As described below, according to the production method of the invention, the degree can be in such a manner that gaseous phosphorus is discharged to a degree which does not substantially affect the recovery rate of phosphorus.

Advantageous Effects of Invention

According to the method for producing phosphorus of the invention, high-purity liquid phosphorus (L) can be quantitatively stably obtained from a liquid phosphoric acid compound as a starting raw material. Moreover, according to the method for producing phosphorus of the invention, phosphorus can be produced from a phosphorus resource contained in steel making slag, sewage sludge or the like, which is abundant in the country, or from a waste containing phosphorus.

The device for producing phosphorus of the invention is a device suitable for carrying out the method for producing phosphorus of the invention.

BRIEF DESCRIPTION OF DRAWINGS

FIG. 1 An example of a figure showing the reaction model concept of the flow reaction.

FIG. 2 A graph showing the relation between the packed bed length and the reduction rate affected by the volume change rate in a reaction with a volume change. The broken line connecting the open circles shows the relation for $\varepsilon_A = 0$, and the broken line connecting the closed circles shows the relation for $\varepsilon_A = 3.28$.

FIG. 3 A graph showing the results of thermal analysis of phosphoric acid containing about 15 mass % water.

FIG. 4 A graph showing the change with time of the weight decrease rate of phosphoric acid containing about 15 mass % water due to vacuum heating at 200° C.

FIG. 5 An example of a schematic view of the structure of the phosphorus oxide reduction horizontal packed bed reactor used in an embodiment (Example 1) of the invention.

FIG. 6 The Raman spectra of the phosphorus prepared in an embodiment (Example 1) of the invention and commercial phosphorus. In FIG. 6, the spectrum of (a) above shows the Raman spectrum of the commercial phosphorus, and the spectrum of (b) below shows the Raman spectrum of the phosphorus prepared in Example 1. The broken lines are auxiliary lines for comparing the absorption positions of the two spectra.

FIG. 7 An example of a schematic view of the structure of the phosphorus oxide reduction vertical packed bed reactor used in an embodiment (Example 2) of the invention.

FIG. 8 An example of a schematic view of the structure of the phosphorus oxide reduction vertical packed bed reactor having a mechanism for continuously or discontinuously supplying phosphoric acid compound-containing activated carbon at an upper part which was used in an embodiment (Example 3) of the invention.

FIG. 9 An example of a schematic view of the structure of the phosphorus oxide reduction vertical packed bed reactor used in embodiments (Examples 4 and 5) of the invention, and the reactor has a mechanism for continuously or discontinuously supplying droplets of a phosphoric acid compound from an upper part.

FIG. 10 A graph showing the change with time of the total volume of the gas generated through the reduction reaction in Example 4.

FIG. 11 A graph showing the change with time of the total volume of the gas generated through the reduction reaction in Example 5.

DESCRIPTION OF EMBODIMENTS

Preferable embodiments of the method for producing phosphorus of the invention are explained.

In the method for producing phosphorus of the invention, a liquid phosphoric acid compound is used as a starting raw material. In the invention, the "phosphoric acid compound" is as described below and is used with meanings including orthophosphoric acid, condensed phosphoric acid formed through dehydration of orthophosphoric acid, phosphorous acid and the like.

Phosphorus oxide obtained by heating a phosphoric acid compound is mainly composed of $P_4O_{10}$ gas and also contains small amounts of PO, $PO_2$ and the like. In the invention, the phosphorus oxide is not limited to one represented by a specific rational formula as long as the phosphorus oxide is oxide of phosphorus. In the following explanation, the phosphorus oxide is explained as a gas of $P_4O_{10}$, which is the main component thereof.

In this regard, although phosphorus oxide has been represented by the composition formula $P_2O_5$ so far, the actual molecular structure is tetraphosphorus decaoxide ($P_4O_{10}$), which has been recently employed also in teaching guidelines for high schools. Thus, also in the invention, phosphorus oxide is represented by $P_4O_{10}$ instead of $P_2O_5$, but the two are synonyms.

Moreover, phosphorus as a gas (gas phase) exists as $P_4$ or $P_2$ molecules but is represented by $P_4$ in the invention for convenience, and formed yellow phosphorus is also represented by $P_4$.

The production of phosphorus which is currently conducted industrially is production of phosphorus from phosphorus ores in an electric furnace, in which phosphorus (g) is produced by smelting reduction of phosphorus ores with carbon at the bottom of a reactor maintained at a high temperature (around 1600° C.). The reaction is shown by the following equation (2) (in the equation, L represents liquid, and g represents gas).

$$P_4O_{10}(L)+10C \rightarrow P_4(g)+10CO \qquad (2)$$

In the reaction, 10 moles of CO gas are generated through the reduction of 1 mole of $P_4O_{10}$. However, the reaction is a reaction between a molten slag containing phosphorus oxide and solid carbon, and the generated CO gas does not directly affect the smelting reduction rate of the phosphorus ores.

Here, when phosphoric acid ($H_3PO_4$) is used as the phosphoric acid compound as the raw material in the production method of the invention, the apparent reduction reaction of the phosphoric acid with a carbon material is shown by the following equation (3), and 23 moles of gases are generated through the reduction of 4 moles of $H_3PO_4$ with the carbon material as a whole.

$$4H_3PO_4(L)+16C \rightarrow P_4(g)+16CO+6H_2 \qquad (3)$$

The actual reaction, however, is mainly composed of the three reactions shown by the following equations (4) to (6), instead of a reaction in which $H_3PO_4$ and carbon (C) come into direct contact as shown in the equation (3). That is, the reactions are (a) generation of $H_2O$ gas and $P_4O_{10}$ gas through heating of $H_3PO_4$ (equation (4)), (b) formation of CO gas and $H_2$ gas through the reaction between the generated $H_2O$ gas and carbon (C) (equation (5)) and (c) formation of $P_4$ gas and CO gas through the reaction between $P_4O_{10}$ gas and carbon (C) (equation (6)).

$$4H_3PO_4(L) \rightarrow 6H_2O(g)+P_4O_{10}(g) \qquad (4)$$

$$H_2O(g)+C \rightarrow CO+H_2 \qquad (5)$$

$$P_4O_{10}(g)+10C \rightarrow P_4(g)+10CO \qquad (6)$$

When phosphorous acid ($H_3PO_3$), metaphosphoric acid ($HPO_3$) or condensed phosphoric acid is used as the phosphoric acid compound as the raw material in the production method of the invention, the reaction also proceeds basically by similar mechanisms to those of phosphoric acid. For example, when pyrophosphoric acid ($H_4P_2O_7$), which is condensed phosphoric acid, is used, 19 moles of gases are generated by the reduction of 2 moles of $H_4P_2O_7$ with a carbon material as a whole as shown by the following equation (7).

$$2H_4P_2O_7+14C \rightarrow P_4(g)+14CO+4H_2 \qquad (7)$$

In a method for producing phosphorus by reducing $P_4O_{10}$ gas generated from a phosphoric acid compound with a carbon material, an important point is that the reduction reaction of $P_4O_{10}$ gas proceeds in a carbon material-packed bed.

The reduction reaction of the phosphoric acid compound with a carbon material is explained in detail below using the case using phosphoric acid as the phosphoric acid compound as an example. However, the following descriptions do not limit the phosphoric acid compound to phosphoric acid, and the same applies to the reduction reaction using phosphoric acid compounds other than phosphoric acid.

The main reactions in the reduction of phosphoric acid with carbon are shown by the equations (4), (5) and (6) above, but in practice, the reactions involve in a very complicated reaction system in which many reactions such as reduction of $P_4O_{10}$ gas with generated $H_2$ or CO, associated generation of $CO_2$ or $H_2O$, a reaction between the generated $CO_2$ and carbon and a water gas shift reaction of $H_2O$ and CO are related to each other. Moreover, as described above, the reduction reaction of phosphoric acid is a reaction in which 23 moles of gases are generated through the consumption of 4 moles of $H_3PO_4$ (L) as a whole.

When the reaction shown by the equation (6) above proceeds in an area at the inlet side of the carbon material-packed bed (an upstream area of the nonoxidizing gas), as a result of generation of 11 moles of gases through the reaction between 1 mole of $P_4O_{10}$ gas and carbon, the gas flow rate in the packed bed increases, and the reaction of $P_4O_{10}$ gas existing in a back area of the packed bed (a downstream area of the nonoxidizing gas) is significantly affected. For example, a decrease in the $P_4O_{10}$ gas partial pressure in the packed bed (in other words, a decrease in the $P_4O_{10}$ gas concentration) or a decrease in the contact period between $P_4O_{10}$ gas and carbon are caused. Because the reaction shown by the equation (5) above takes place at the same time, the gas flow rate further increases, and the $P_4O_{10}$ gas concentration further decreases. Because the formation reaction rate of yellow phosphorus corresponds to the $P_4O_{10}$ gas concentration, the decrease in the $P_4O_{10}$ gas concentration results in a decrease in the formation reaction rate of yellow phosphorus.

Because many reactions are involved in practice in the equation (3) above, which is the apparent reaction equation showing the formation reaction of yellow phosphorus, the accurate analysis of the reaction is not easy. However, for industrial implementation of the production of yellow phosphorus through the reduction of phosphorus oxide using the carbon material-packed bed of the invention, it is required to establish a realistic and simple method for assessing the reduction reaction of $P_4O_{10}$ gas in the carbon material-packed bed even when the method is an approximate method.

(Reduction Reaction Model of $P_4O_{10}$ Gas in Carbon Material-Packed Bed)

As described above, the volume of the reaction system increases with the progress of the reaction in the reduction reaction of phosphorus oxide with a carbon material. A reaction model for easily assessing the reduction reaction considering the increase is shown below.

In the reaction model, the reaction of phosphorus oxide in the carbon material-packed bed is regarded as a flow reaction, and the flow in the packed bed is assumed to be a plug flow by ignoring the carbon material-packed bed in the packed bed. That is, the flow in the packed bed is regarded as a series of infinitely thin discs dV as shown in FIG. 1 and is considered as a flow at a constant speed in the tube. Moreover, the concentration of the $P_4O_{10}$ gas in dV is assumed to be constant. When the reduction reaction is approximated as a first-order reaction in proportion to the $P_4O_{10}$ gas concentration, the reaction rate is represented by the following equation (8).

$$\text{Reaction Rate} = -k[P_4O_{10} \text{ Gas Concentration}] \qquad (8)$$

Here, k is the apparent reaction rate coefficient. The apparent reaction rate coefficient k in practice depends on the packing ratio of the carbon material-packed bed, the particle size of the carbon material particles constituting the carbon material-packed bed, the surface area and the kind of the carbon material particles and the like. In the reaction model, however, the apparent reaction rate coefficient k is used as a parameter representing the reaction including all the influences of the respective parameters.

The volume of the reaction system increases with the progress of the reaction in the reduction reaction of phosphorus oxide with a carbon material. In this case, the apparent reaction rate coefficient k of the first-order reaction in the flow reactor illustrated in FIG. 1 can be represented by the following equation (9). In this regard, Octave Levenspiel; Chemical Reaction Engineering, 3rd Ed., John Wiley & Sons, New York 1998 can be referred to.

[Math. 1]

$$k = \frac{F_{A0}}{VC_{A0}}\left[(1 + \varepsilon_A)\ln\frac{1}{1 - X_A} - \varepsilon_A X_A\right] \qquad (9)$$

Here, $F_{A0}$ indicates the supply rate of $P_4O_{10}$ gas to the inlet of the packed bed, and $C_{A0}$ indicates the initial concentration of $P_4O_{10}$ gas at the inlet of the packed bed. V indicates the apparent volume of the packed bed, and $X_A$ indicates the reduction rate of $P_4O_{10}$ (mole ratio) at each position of the packed bed. Moreover, $\varepsilon_A$ means the increase rate of the volume due to the reaction and is calculated from the initial volume Volo and the volume $Vol_F$ after the completion of the reaction based on the following equation (10).

[Math. 2]

$$\varepsilon_A = \frac{[Vol_F(X_A = 1) - Vol_0(X_A = 0)]}{Vol_0(X_A = 0)} \qquad (10)$$

In the case of reduction of $P_4O_{10}$ gas, 1 mole of $P_4$ gas, 16 moles of CO gas and 6 moles of $H_2$ gas are generated from 6 moles of water vapor and 1 mole of $P_4O_{10}$ gas when calculated from the equations (3) to (6) above. Thus, $\varepsilon_A$ is 2.28. In the case with an initial $P_4O_{10}$ gas concentration of 1.34 $mol/m^3$, a supply rate of $P_4O_{10}$ gas of 0.229 mol/hr and a reduction rate $X_A$ of $P_4O_{10}$ gas of 0.73 (calculated from the total volume of the generated gas), the apparent reaction rate coefficient k is 2.63 ($hr^{-1}$).

When k can be determined using the equation (8) above, the change in the reduction rate $X_A$ caused by a change in each parameter can be calculated. Moreover, in reverse, a parameter value, for example, the length of the packed bed, which is required for obtaining a predetermined reduction rate $X_A$ can also be calculated.

In FIG. 2, the relations between the reduction rate $X_A$ of $P_4O_{10}$ gas and the packed bed length, for the case where the volume increase rate $\varepsilon_A$ is 0 and the case where $\varepsilon_A$ is 3.28, are shown. As seen from FIG. 2, a longer packed bed is required to achieve a same reduction rate when the volume increases ($\varepsilon_A$=3.28, indicated with the broken line connecting the closed circles in FIG. 2) as compared to the case without any volume increase ($\varepsilon_A$=0, indicated with the broken line connecting the open circles in FIG. 2).

This means that, in the reduction of phosphoric acid, for example when the reduction rate is 75% ($X_A$=0.75) with a packed bed length of 10 cm, in order to further achieve the reduction rate of 90% ($X_A$=0.90), the length of the packed bed needs to be approximately doubled to 18 cm in the case of $\varepsilon_A$=3.28 while it is sufficient to increase the packed bed length by about 3 cm in the case of $\varepsilon_A$=0. When the actual operation is taken into consideration, the carbon amount, the energy for heating the packed bed and the costs for building the device which are required to make the packed bed about twice the length are similarly around twice the values.

Unreacted $P_4O_{10}$ easily dissolves in water and thus can be recovered as phosphoric acid in a container holding water (for example, a flask container filled with water for recovering yellow phosphorus which was used in the Examples described below). In the case of recovery in a yellow phosphorus recovery container, after separation from yellow phosphorus, unreacted $P_4O_{10}$ can also be reused as the phosphoric acid compound which is the raw material used in the production method of the invention.

Accordingly, whether to choose the packed bed length of 18 cm to achieve the reduction rate of 90% or the packed bed length of 10 cm to recover 25% of unreacted $P_4O_{10}$ as phosphoric acid can be decided from the economical point of view, comprehensively considering the total cost.

In the production method of the invention, a method in which phosphorus is produced under the condition of a reduction rate of 70% or more (preferably 80% or more, more preferably 90% or more) and in which $P_4O_{10}$ recovered as phosphoric acid is reused is more reasonable and preferable.

In this regard, the reduction rate of phosphorus oxide $(P_4O_{10})$ in the invention means the formation rate of phosphorus (g) where the case where the generated phosphorus oxide is entirely reduced to phosphorus (g) is regarded as 100%. The "under the condition of a reduction rate of phosphorus oxide of 70% or more" means the condition under which the average reduction rate from the start of the formation of liquid phosphorus (L) to the completion of feeding of the raw material phosphoric acid compound becomes 70% or more. Here, the formation rate of phosphorus (g) can be calculated from the volumes of CO and $H_2$ where it is assumed that $P_4O_{10}$ formed from the supplied phosphoric acid compound is generated by the equations (3) and (7) and the like. This means that, when the yield of liquid phosphorus (L) calculated from the raw material phosphoric acid compound is 70% or more, the condition under which the reduction rate of phosphorus oxide becomes 70% or more is satisfied.

Using the reaction model described above, production in the industrial scale can be easily estimated from the apparent reaction rate coefficient k obtained from small-scale experiment, under the same conditions for the features of the packed bed used in the experiment for obtaining the k (the packing ratio and the like) and the features of the carbon material used (the particle size of the carbon particles, the surface area of the carbon particles, the carbon kind and the like).

A main reason why phosphorus and the polyphosphoric acid compound adhered to the quartz tube wall as a mixture in PTL 3 is believed to be that, due to the high supply rate of phosphorus oxide to the packed bed by heating of phosphoric acid and due to generation of large volumes of CO and $H_2$ through the reactions with carbon (the reactions of the equation (5) and the equation (6)), a large volume of unreacted $P_4O_{10}$ gas remaining in the carbon material-packed bed was discharged outside from the bed. Accordingly, when the reduction reaction in the carbon material-packed bed is conducted using phosphoric acid as a raw material, it is important that the reactions of the equation (5) and the equation (6) proceed in the packed bed as far as possible in the range in which the polyphosphoric acid compound is not formed.

In the invention, the carbon material used as the reducing material for phosphorus oxide is not particularly limited but is preferably a carbon material having a large specific surface area, and activated carbon, coke, carbon black, graphite, carbon fibers, carbon nanotube (CNT), VGCF (trademark), fullerene, charcoal and the like are used.

<Phosphorus>

Allotropes of phosphorus have long been known as white phosphorus (yellow phosphorus), red phosphorus, violet phosphorus, black phosphorus, scarlet phosphorus and the like. Yellow phosphorus was regarded as an allotrope but is in fact crude white phosphorus containing impurities (red phosphorus and the like) and is not considered as an allotrope. White phosphorus (P4) is formed from molecules in a tetrahedral structure and is a white waxy solid at normal temperature under normal pressure having a specific gravity of 1.82, a melting point of 44° C. and a boiling point of 280° C. White phosphorus turns into red phosphorus through exposure to sunlight. Red phosphorus is a mixture containing violet phosphorus as the main component and white phosphorus and is reddish brown powder having a specific gravity of 2.20 to 2.34, a melting point of 590° C. and an ignition point of 260° C. Violet phosphorus is a solid having a specific gravity of 2.36 and has brownish dark violet color and metallic luster. Black phosphorus is a solid having a specific gravity of 2.69 and is the most stable of the allotropes.

Although there are several allotropes of phosphorus as described above, the phosphorus obtained by the production method of the invention is not limited to a specific allotrope, and the term "phosphorus" is used in the invention with meanings including all the allotropes. For example, white phosphorus has a boiling point of 280° C. and a melting point of 44° C., and phosphorus is expected to condense as a liquid when generated high-temperature phosphorus (g) is cooled to a range of lower than 280° C. to 44° C. or higher. In PTL 3, however, despite the temperature range of the boiling point of phosphorus or lower, phosphorus (L) was not formed. Moreover, phosphorus is believed to exhibit a remarkable supercooling phenomenon also at the melting point of 44° C. or lower and sometimes exhibits a liquid state also at room temperature of 44° C. or lower.

In a flow reaction system of supplying a phosphoric acid compound from upstream, condensing gaseous phosphorus (g) in downstream and recovering as liquid phosphorus (L), it is believed that, when the temperature of the packed bed at the most downstream part is lower than 280° C., phosphorus (g) condenses to phosphorus (L) at the low-temperature packed bed part set at lower than 280° C., which enables recovery in a liquid form. In PTL 3, to recover phosphorus (g) which did not deposit on the tube wall but was discharged outside from the reactor, the discharged gas was bubbled into water at room temperature, but phosphorus (L) barely existed in water. This indicates that merely maintaining the temperature at the boiling point or lower is insufficient to condense phosphorus (g) and recover phosphorus (L) and that it is required to accelerate the condensation of phosphorus vapor using a method such as the condensation method through contact with water spray in a scrubber, which is employed in the conventional carbon reduction in an electric furnace.

Even when the gas volume in the carbon material-packed bed increases with the progress of the reaction of the equation (5) and/or the equation (6) above, the reaction between the $P_4O_{10}$ gas introduced to the carbon material-packed bed and carbon can progress sufficiently in the carbon material-packed bed when the carbon material-packed bed is sufficiently long. In practice, however, due to the limits of the costs and the place and the like, the length of the carbon material-packed bed cannot be a predetermined length or more. Accordingly, it is required to learn the reaction amount for completing the reduction reaction with the limited length of the carbon material-packed bed. When it is assumed that the reduction reaction completes in the carbon material-packed bed and that the entire formed phosphorus is recovered as a liquid, the discharged gas consists of CO and $H_2$ generated through the reduction and the nonoxidizing gas such as Ar gas used for carrying the $P_4O_{10}$ gas. Thus, the reaction amount in the entire carbon material-packed bed at each predetermined time can be assessed by measuring the flow rate of the gas discharged from the reaction tube (column) in the flow reaction. $P_4O_{10}$ is a compound having a melting point of 340° C. and a sublimation point of 360° C. and is highly reactive to water, and the reverse reaction of the equation (4) above takes place unless the reaction of the equation (5) does not progress.

After separation operation, the discharged gas can also be used as a material or fuel or reused as a nonoxidizing gas in the production method of the invention.

The reaction amount in the carbon material-packed bed is determined by the supply rate of $P_4O_{10}$ gas into the carbon material-packed bed. The $P_4O_{10}$ gas supply volume is determined by the temperature of the phosphoric acid compound-heating area when the flow rate of the carrier gas (a nonoxidizing gas, for example, a rare gas such as Ar or nitrogen gas) introduced into the phosphoric acid compound-heating area is constant. Thus, in a packed bed having predetermined features (the length, the particle size of the carbon material particles, the reaction tube diameter and the like), by changing the temperature of the phosphoric acid compound-heating area to regulate the volume of the generated $P_4O_{10}$ gas, measuring the flow rate of the gas discharged from the reaction tube in response thereto and determining the temperature of the phosphoric acid compound-heating area at which unreacted $P_4O_{10}$ does not deposit on the reaction tube wall, the temperature of the phosphoric acid compound-heating area at which the reduction of $P_4O_{10}$ gas progresses at a specific reduction rate in the packed bed set at a predetermined length, namely the $P_4O_{10}$ gas supply rate, can be determined. In this regard, the deposition of $P_4O_{10}$ on the reaction wall can be easily confirmed by the color.

Although it is difficult to directly measure the volume of the $P_4O_{10}$ gas generated by heating, the total volume of the gas generated through the reaction (referred to as the total discharged gas flow rate in the invention) can be easily measured. Accordingly, when the supply temperature of $P_4O_{10}$ at which $P_4O_{10}$ does not deposit on the reaction tube wall in the carbon material-packed bed having predetermined features can be found based on the measurement of the total discharged gas flow rate, the reduction reaction of $P_4O_{10}$ can be advanced at a specific reduction rate in the carbon material-packed bed by setting and regulating the temperature of the phosphoric acid compound-heating area at the temperature or lower.

Thus, in the invention, the gas generation volume can be measured using a flow meter, and the total discharged gas flow rate (the total discharged gas generation volume) can be regulated by any of the followings so that the increase in the gas generation volume does not exceed the acceptable range.

That is, by at least any of regulation of the temperature for generating phosphorus oxide by heating the raw material phosphoric acid compound (in the invention, also abbreviated to as the "heating temperature of the phosphoric acid compound"), regulation of the temperature for bringing phosphorus oxide into contact with the carbon material-packed bed to reduce the phosphorus oxide (in the invention, also abbreviated to as the "reduction reaction temperature of phosphorus oxide") and regulation of the feed amount of the raw material phosphoric acid compound to the reaction tube, while measuring the amount of increase in the gas generation, the total discharged gas flow rate can be regulated.

Moreover, also by adjusting the nonoxidizing gas flow rate, the gas generation volume can be adjusted.

For example, it is preferable to regulate the gas flow rate in the carbon material-packed bed at a predetermined value or less by regulating the temperature of the phosphoric acid compound-heating area based on the value of the total discharged gas flow rate (change) and to increase the reduction rate of $P_4O_{10}$ generated from the raw material phosphoric acid compound in the reduction reaction bed (the carbon material-packed bed) to a range of a specific reduction rate or more to regulate the reduction into phosphorus (g).

In the invention, in view of the stable thermal balance, it is preferable to conduct the reduction reaction of phosphorus oxide in the carbon material-packed bed in such a manner that the reduction rate of phosphorus oxide becomes 70% or more by adjusting (regulating) at least one of the heating temperature of the phosphoric acid compound and the nonoxidizing gas flow rate.

Furthermore, to recover the gaseous phosphorus (g) generated through the reduction in the carbon material-packed bed as liquid phosphorus (L), it is preferable to further extend the carbon material-packed bed to the later stage (downstream) of the carbon material-packed bed for the reduction reaction. The extended part of the carbon material-packed bed (the part at a temperature lower than 280° C.) serves as a condensation accelerator-packed bed, and as described below, the temperature at the outlet (downstream) end is preferably set at 44° C. or higher or the lower limit temperature at which phosphorus (g) substantially condenses or higher, more preferably set at 44° C. or higher and further preferably set at 100° C. or higher. Moreover, it is more preferable to provide a condensation accelerator (carbon material particles and the like)-packed bed which accelerates the condensation of gaseous phosphorus (g) in contact with the carbon material-packed bed. By letting gaseous phosphorus (g) pass through the narrow space in the condensation accelerator-packed bed, the frequencies of the collision of phosphorus (g) with the surface of the carbon material constituting the packed bed and the collision among phosphorus (g) molecules can be increased, and the nucleation and the growth of phosphorus (L) as liquid are accelerated. As a result, liquid phosphorus (g) can be condensed effectively on the surface of the condensation accelerator or the wall of the reaction tube having the condensation accelerator-packed bed. By letting phosphorus (L) formed into a liquid flow downstream, for example by condensing in a container containing water which is disposed below the reaction tube, phosphorus (L) can be recovered more efficiently.

<Condensation Accelerator>

As the material used as the condensation accelerator, a material which does not react with phosphorus vapor (phosphorus (g)) and which can transfer the heat of condensation of phosphorus vapor into phosphorus (liquid) can be used without particular restriction. For example, carbon materials such as activated carbon, coke, carbon black, graphite, carbon fibers, carbon nanotubes (CNT) including VGCF (product name, manufactured by SHOWA DENKO K.K.) and the like, fullerene, charcoal and glassy carbon, inorganic materials such as glass, quartz, silica gel, silica alumina, alumina, molecular sieve, clay, diatom and pumice, polymer materials such as porous beads of styrene-divinylbenzene copolymer and Teflon (registered trademark, manufactured by DuPont) and metal materials can be used.

Moreover, the shape, the size and the like of the condensation accelerator are not particularly limited, but a porous granular material or plate-like material is preferably used.

The condensation accelerator-packed bed is not particularly restricted as long as the condensation accelerator-packed bed has a permeable structure in which phosphorus (g) is condensed in the bed and in which the generated gas does not stay in the condensation accelerator-packed bed and can flow downstream in the reaction tube, and a bed filled with the deposition accelerator can be used.

The volume that the condensation accelerator-packed bed occupies per mass (gram) of the raw material phosphoric acid compound depends on the specific gravity, the surface area, the specific surface area and the like of the condensation accelerator. In view of the condensation effect and the costs, the volume is preferably 0.01 to 100 cm$^3$/gram, more preferably 0.1 to 50 cm$^3$/gram.

In the method for producing phosphorus of the invention which achieves the contents described above, the reaction for forming gaseous phosphorus (g) by bringing phosphorus oxide generated by heating the liquid phosphoric acid compound into contact with the carbon material to reduce the phosphorus oxide and for condensing the gaseous phosphorus (g) to obtain liquid phosphorus (L) is conducted by a flow reaction with a nonoxidizing gas flow. As described above, the reduction reaction of the phosphorus oxide is conducted in the carbon material-packed bed, and the condensation of the formed gaseous phosphorus (g) is substantially conducted in the condensation accelerator-packed bed which is disposed downstream of the carbon material-packed bed in contact with the carbon material-packed bed.

That is, the method for producing phosphorus of the invention is composed of, in the flow reaction with a nonoxidizing gas flow, the three elements of (1) generation of phosphorus oxide (mainly P$_4$O$_{10}$) through heating of the phosphoric acid compound, (2) reduction of the generated phosphorus oxide with the carbon material (the carbon material-packed bed) and (3) formation of phosphorus (L) as liquid through condensation of the formed phosphorus (g) in the deposition accelerator-packed bed.

<Phosphoric Acid Compound>

As the phosphoric acid compound used in the method for producing phosphorus of the invention, not only general phosphoric acid (H$_3$PO$_4$), phosphorous acid (H$_3$PO$_3$) and metaphosphoric acid (HPO$_3$) but also condensed phosphoric acid represented by the rational formula H$_{n+2}$P$_n$O$_{3n+1}$ (1≤n≤3) can be used. Because the viscosity of condensed phosphoric acid becomes large and because the supply becomes difficult, n is not preferably 4 or more.

Known examples of condensed phosphoric acid represented by the rational formula: H$_{n+2}$P$_n$O$_{3n+1}$ include orthophosphoric acid of n=1, pyrophosphoric acid (diphosphoric acid) of n=2, tripolyphosphoric acid (triphosphoric acid) or cyclotriphosphoric acid of n=3, tetrapolyphosphoric acid (tetraphosphoric acid) of n=4, polyphosphoric acid with higher n and the like. Phosphoric acid of n=2 or more is generally called condensed phosphoric acid and is generated by heat dehydration of H$_3$PO$_4$.

Orthophosphoric acid (H$_3$PO$_4$) of n=1, which is generally commercially available as "phosphoric acid", is phosphoric acid containing water generally containing about 15 mass % water. In the invention, orthophosphoric acid of n=1 which contains almost no water (water percentage of 0.1 mass % or less) is called orthophosphoric acid, and phosphoric acid containing water having water percentage exceeding 0.1 mass % is called phosphoric acid.

When the phosphoric acid containing water is supplied to the carbon material-packed bed, because more heat for evaporation of extra water is required than that for dehydrated phosphoric acid due to evaporation of water during the heating process and because carbon is consumed in the reaction between the generated water vapor and carbon, the water content of the raw material of the supplied phosphoric acid compound is preferably low.

When phosphoric acid containing water is heated, the water is evaporated to form orthophosphoric acid (also called orthophosphoric anhydride), and further heating results in formation of condensed phosphoric acid such as pyrophosphoric acid (diphosphoric acid: H$_4$P$_2$O$_7$). The water amount of condensed phosphoric acid formed through dehydration of phosphoric acid (H$_3$PO$_4$) is desirably low in view of the vaporization heat. However, a decrease in the water content of condensed phosphoric acid increases the viscosity, and handling sometimes becomes difficult. The viscosity of pyrophosphoric acid is not so different from that of orthophosphoric acid (H$_3$PO$_4$). Thus, as condensed phosphoric acid used as the supplied raw material, orthophosphoric acid or pyrophosphoric acid (diphosphoric acid) is practically preferable.

In the invention, crude condensed phosphoric acid can also be used as the phosphoric acid compound. Crude condensed phosphoric acid means a mixture of condensed phosphoric acids of 1≤n<4 of condensed phosphoric acids represented by the rational formula H$_{n+2}$P$_n$O$_{3n+1}$.

The phosphoric acid compound used in the invention may contain impurities in addition to the phosphoric acid compound and water. For example, in the method for producing phosphorus of the invention, crude phosphoric acid and/or crude phosphorous acid which are obtained by leaching from steel making slag obtained in steel industry with an acid can be used. For example, as shown in Table 1, an example of leach solution A of crude phosphoric acid and/or crude phosphorous acid is a solution obtained by modifying CaO—SiO$_2$—Fe$_2$O$_3$-8 mass % P$_2$O$_5$—MgO-based slag with K$_2$O and leaching with citric acid at pH=6, and an example of leach solution B is a solution obtained by modifying CaO—SiO$_2$—Fe$_2$O$_{3-8}$ mass % P$_2$O$_5$—MgO-based slag with Na$_2$O and leaching with citric acid at pH=6. An example of leach solution C is a solution obtained by leaching CaO—SiO$_2$—Fe$_2$O$_{3-3}$ mass % P$_2$O$_5$—MgO—MnO—Al$_2$O$_3$-based slag with nitric acid at pH=3. The compositions of leach solutions A, B and C are as shown in Table 1 below (unit is mg/L).

According to the method for producing phosphorus of the invention, because at least any of crude phosphoric acid, crude condensed phosphoric acid and crude phosphorous acid can be used as the phosphoric acid compound, phosphorus can be produced from a phosphorus resource contained in steel making slag, sewage sludge or the like or a waste containing phosphorus.

TABLE 1

|  | Ca | Si | P | Fe | Mg | Mn | Al | Na | K |
|---|---|---|---|---|---|---|---|---|---|
| Leach Solution A | 328.37 | 73.49 | 65.16 | 5.02 | 4.05 |  |  | 0.78 | 25.12 |
| Leach Solution B | 301.01 | 69.60 | 63.03 | 6.25 | 2.51 |  |  | 35.54 |  |

TABLE 1-continued

| | Ca | Si | P | Fe | Mg | Mn | Al | Na | K |
|---|---|---|---|---|---|---|---|---|---|
| Leach Solution C | 1938.5 | 832.1 | 93.5 | 6.7 | 189.3 | 21.7 | 2.1 | | |

When crude phosphoric acid and/or crude phosphorous acid are used, inclusion of heavy metal elements having a low boiling point, such as cadmium, mercury and arsenic, may affect the purity of obtained phosphorus (L). Thus, the heavy metal elements are desirably removed from crude phosphoric acid and/or crude phosphorous acid by a normal method before use in the production method of the invention.

On the other hand, metal elements having a high boiling point, such as nickel contained in a liquid waste of plating, are not believed to affect the purity of phosphorus (L) in the production method of the invention. The metal elements may be removed by a normal method before use as the heavy metal elements.

The ash or the like contained in crude phosphoric acid and/or crude phosphorous acid may be removed by a normal method before use as the raw material, and a removal step may be provided in an intermediate step in the production method of the invention. In this regard, however, those which form an oxide with a low melting point are desirably removed before use as the raw material.

<Nonoxidizing Gas>

In the production method of the invention, the nonoxidizing gas flowing in the reaction system to provide a nonoxidizing gas atmosphere is a reducing gas such as hydrogen gas, carbon monoxide gas and hydrocarbon gas ($CH_4$, $C_3H_8$, $C_4H_{10}$ or the like) or an inert gas such as argon gas and helium gas. Of these, an inert gas is preferable considering the safety.

Historically, phosphorus ($P_4$) was produced from phosphoric acid ($H_3PO_4$) in 1770 by Scheele and Gahn by mixing phosphoric acid and charcoal and heating the mixture in a crucible. The crucible heating method had been conducted until 1888 when the electric furnace method was introduced. The crucible heating method is a batch method in which the crucible is replaced with a new crucible after depositing yellow phosphorus formed by heating a crucible filled with the raw material on the wall of the upper crucible part at a low temperature and recovering the yellow phosphorus deposited by cooling the crucible to room temperature.

Thus, the production efficiency was extremely low, and the method was replaced by the electric furnace method, which has high productivity due to continuous operation. This suggests that, when yellow phosphorus can be quantitatively stably produced by carbon reduction of phosphoric acid, which can be operated at a lower temperature than in the electric furnace method, economical and low-environmental-load production of yellow phosphorus which can replace the current electric furnace method is possible. For continuous operation, it is required to supply liquid phosphoric acid to a high-temperature part at around 1000° C. In this case, however, liquid phosphoric acid vaporizes instantly after contact with the high-temperature part, and the volume expands rapidly. Thus, it is difficult to stably proceed with the formation reaction of yellow phosphorus. Such a problem does not arise in the crucible heating method because phosphoric acid is heated from room temperature to a high-temperature range.

According to an embodiment of the production method of the invention, as described in detail below, while rapid expansion of volume due to momentary vaporization of the phosphoric acid compound is prevented, the phosphoric acid compound can be continuously or discontinuously supplied to the high-temperature part, and yellow phosphorus can also be quantitatively stably produced.

In the invention, to "continuously or discontinuously supply the phosphoric acid compound" may be a form in which the phosphoric acid compound is supplied in such a manner that aimed phosphorus as liquid is quantitatively stably formed without interruption. For example, a discontinuous supply form is a form of intermittently supplying at each certain time and is, as described below, a form of dropping droplets at constant intervals or supplying a carbon material impregnated with the phosphoric acid compound at constant intervals.

In the production method of the invention, the formation rate of $P_4O_{10}$ gas largely depends on the supply style of the phosphoric acid compound to the carbon material-packed bed.

To quantitatively stably produce yellow phosphorus, the supply form of the phosphoric acid compound into the reactor needs to be adjusted. In the current electric furnace method, the raw material phosphorus ores, carbon as the reducing agent, silica and the like are charged from an upper part of the electric furnace at predetermined intervals to conduct carbon reduction, and the generated phosphorus vapor is led to a scrubber from an upper part of the electric furnace and recovered. The charged raw materials are all solids, and when the materials are supplied to the electric furnace at a high temperature, the charged raw materials gradually melt and gather at a lower part of the furnace with the increase in the temperature, which results in the start of reduction.

When the phosphoric acid compound as liquid is supplied to the high-temperature part, however, a huge problem arises. Because the phosphoric acid compound is a liquid containing water, phreatic explosion may be caused due to evaporation of water when the phosphoric acid compound is directly supplied to an upper part of the carbon material-packed bed at around 1000° C., and it becomes difficult to continue the reaction. Thus, a supply method avoiding such rapid expansion of volume is required.

Water vapor and $P_4O_{10}$ are generated through heating of the phosphoric acid compound, and the phosphoric acid compound itself is dehydrated and condensed accordingly to form a polymer represented by $H_n + 2P_nO_{3n+1}$ (condensed phosphoric acid). Phosphoric acid polymers having various polymerization degrees are formed with an increase in the temperature. As the condensation progresses, the apparent $P_4O_{10}$ concentration increases, and the generation rate of $P_4O_{10}$ gas changes with the composition. To elucidate the evaporation behavior of the phosphoric acid compound with an increase in the temperature, heating experiment (heating rate of 10° C./min) of phosphoric acid ($H_3PO_4$) was conducted using a thermobalance. The results are shown in FIG. 3. In FIG. 3, the horizontal axis is the heating temperature (unit: ° C.), and the vertical axis is the weight change rate of the sample (phosphoric acid) (unit: %).

In FIG. 3, the sample exists in the state of almost 85% $H_3PO_4$ at (1) 100° C., and then through evaporation of water due to the increase in the temperature, the sample turns to orthophosphoric acid at (2) about 250° C. and has the composition of pyrophosphoric acid (diphosphoric acid) through the further increase in the temperature. Then, the weight decrease rate becomes smaller, and the condensation reaction rate decreases. The weight decreases rapidly after reaching (3) about 770° C. This corresponds to the start of direct vaporization of $P_4O_{10}$. The weight barely decreases after reaching (4) about 830° C., which corresponds to the nearly completion of the $P_4O_{10}$ vaporization.

The curve in FIG. 3 shows the reaction represented by the equation below.

$$H_{n+2}P_nO_{3n+1}=(n/4)P_4O_{10}+((n+2)/2)H_2O$$

From the results shown in FIG. 3, it can be seen that, although the evaporation rate of $P_4O_{10}$ is slow until the temperature reaches 770° C., the evaporation of $P_4O_{10}$ progresses rapidly after reaching 770° C. In the actual case, the temperature increases at a far greater heating rate than 10° C./min.

This indicates that, when the phosphoric acid compound is supplied to the upper surface of the packed bed maintained at 1000° C., the temperature increases rapidly, which causes not only phreatic explosion immediately after the supply but also rapid expansion of volume due to formation of $P_4O_{10}$ gas through the rapid temperature increase. Thus, the vaporization of water and the rapid formation of $P_4O_{10}$ gas increase the gas flow speed in the packed bed and considerably destabilize the reaction. Therefore, it has been found that regulation of the temperature increase of the supplied phosphoric acid compound is crucial to progress the reduction reaction of $P_4O_{10}$ stably.

The inventors have conducted various examinations to solve the problem, and as a result, the inventors have found that, by impregnating a porous carrier (for example, activated carbon) with the phosphoric acid compound at a predetermined ratio and feeding the porous carrier (activated carbon) impregnated with the phosphoric acid compound to the upstream at predetermined intervals, it is possible to slow down the temperature increase due to heating of the phosphoric acid compound soaked in the activated carbon and to regulate the rapid evaporation of $H_2O$ and $P_4O_{10}$.

Moreover, as described above, the water contained in the phosphoric acid compound as the raw material turns into water vapor after heating, reacts with carbon through the reaction represented by the equation (5) described above and consumes carbon. Thus, the water content of the phosphoric acid compound as the raw material is desirably as low as possible.

The results of vacuum dehydration of phosphoric acid containing water (water percentage of 15 mass %) at 200° C. are shown in FIG. 4. The broken line in the figure shows the value at which phosphoric acid containing water is dehydrated to generate orthophosphoric anhydride.

When the weight of phosphoric acid containing water at the beginning of vacuum dehydration (0 hour) is regarded as 100% (weight decrease rate of 0%), the composition becomes close to almost the composition of pyrophosphoric acid ($H_4P_2O_7$) through treatment for around four hours, and after 24 hours, the apparent composition is close to the composition of tripolyphosphoric acid ($H_5P_3O_{10}$). Because the water contents of pyrophosphoric acid and tripolyphosphoric acid are not so different, it is sufficient to conduct the treatment to generate pyrophosphoric acid as the dehydration pretreatment of phosphoric acid.

Therefore, it is desirable to reduce the water content through vacuum dehydration of phosphoric acid containing water at 200° C. as preliminary treatment to turn into orthophosphoric anhydride or pyrophosphoric acid ($H_4P_2O_7$) and impregnate activated carbon therewith for supply, in order to reduce the energy consumption and the use amount of the carbon raw material.

It was also found that, when a phosphoric acid compound which has been subjected to the preliminary treatment is used as the raw material, the reduction reaction can be conducted continuously and stably by dropping and supplying droplets thereof at predetermined intervals without impregnation of activated carbon.

As means for regulating the temperature increase of the supplied phosphoric acid compound and slowing down the temperature increase, a container (quartz or graphite) holding a predetermined amount of the phosphoric acid compound is disposed at the gas inlet side of the packed bed for conducting the reduction reaction, or a container filled with a substance impregnated with the phosphoric acid compound (for example, activated carbon containing the phosphoric acid compound or the like) or a part holding the filling is heated. The reduction reaction can be conducted continuously and stably by supplementing a predetermined amount of the phosphoric acid compound to the container based on the decrease in the phosphoric acid compound or supplementing by feeding the substance impregnated with the phosphoric acid compound from an upper part or dropping droplets of the phosphoric acid compound (orthophosphoric anhydride, pyrophosphoric acid ($H_4P_2O_7$) or the like) in the case of using a vertical packed bed reactor. The phosphoric acid compound may be supplemented to the phosphoric acid compound-heating area continuously without interruption or intermittently at each predetermined time. Here, the temperature for heating the phosphoric acid compound is preferably in the range of 200 to 1000° C. (200° C. or higher and 1000° C. or lower), more preferably in the range of 300 to 1000° C. (300° C. or higher and 1000° C. or lower).

As illustrated in FIG. 9, in the form of dropping droplets of the phosphoric acid compound, the volume of the droplets of the dropped phosphoric acid compound, the temperature of the heating area for the dropped droplets (for example, the phosphoric acid compound droplet-heating area D in FIG. 9) and the like are adjusted so that the phosphoric acid compound becomes phosphorus oxide on the surface after falling on the upper surface (the surface at the most upstream side) of the carbon material-packed bed area. Thus, as illustrated in FIG. 9, in the form of supplying the phosphoric acid compound by dropping as droplets, the "phosphoric acid compound-heating area for heating the liquid phosphoric acid compound to generate phosphorus oxide" means the area from the phosphoric acid compound droplet-heating area D to the upstream surface where phosphorus oxide is generated in the carbon material-packed bed area E, and the "carbon material-packed bed area for reducing the phosphorus oxide generated in the phosphoric acid compound-heating area to form gaseous phosphorus (g)" means the area in the carbon material-packed bed area E excluding the upstream surface where phosphorus oxide is generated. Moreover, the "condensation accelerator-packed bed area for condensing the gaseous phosphorus (g) generated in the carbon material-packed bed area to generate liquid phosphorus (L)" means the condensation accelerator-packed bed area C. The "heating temperature of the liquid phosphoric acid compound" means the temperature of the phosphoric acid compound droplet-heating area D.

From the above points, the liquid phosphoric acid compound is preferably dropped as microdroplets of a volume of 15 µl or less. The lower limit of the volume of the microdroplets is not particularly restricted but is preferably 8 µl or more, for example. The phosphoric acid compound can be dropped as microdroplets, for example, using a nozzle having an inner diameter of 0.6 mm or less and having a shape in which the tip is cut at an angle of about 10 to 12°. The material of the nozzle is not particularly restricted, but stainless steel, Teflon (registered trademark, manufactured by DuPont) or the like can be used. The nozzle used can be appropriately adjusted depending on the kind of the phosphoric acid compound considering the viscosity or the like.
<Carbon Material-Packed Bed>

In the invention, the carbon material used for the carbon material-packed bed used for the reduction reaction of $P_4O_{10}$ is a carbon material which can reduce the phosphoric acid compound and is not particularly limited. Examples thereof include known graphite, amorphous carbon, charcoal and activated carbon. Amorphous carbon is carbon black, coal, coke, soot or the like. Regarding the form of the carbon material, for example, a formed material of a powder, granular or porous carbon material is used. In this regard, however, when a powder carbon material is directly packed into the packed bed, the pressure in the bed increases, and the gas flow sometimes stops. Thus, the carbon material is preferably used as granules or bulks.

As described below, regarding the porous carrier impregnated with the phosphoric acid compound, which can be used for supplying the phosphoric acid compound, a porous carbon material, of the carbon materials described as the carbon material, can be used as the porous carrier. Moreover, a carbon material-packed bed formed with the carbon material can be used also for the part for heating the phosphoric acid compound to generate phosphorus oxide.

The carbon material-packed bed is formed by filling a reaction tube with the carbon material in such a manner that the generated gas does not remain in the carbon bed and can flow downstream of the reaction tube.

The temperature of the reduction reaction packed bed area is preferably in the range of 700° C. to 1200° C. (700° C. or higher and 1200° C. or lower), more preferably in the range of 900 to 1100° C. (900° C. or higher and 1100° C. or lower).

In the invention, the carbon material is preferably added to the carbon material-packed bed at each predetermined time depending on the amount of decrease in the filling carbon material due to the reduction reaction of phosphorus oxide. For example, to continuously obtain liquid phosphorus, the height of the carbon material-packed bed is preferably maintained almost constant. To maintain the height of the carbon material bed almost constant is preferably, for example, to maintain the height in the range of the height of the carbon material bed at the beginning of the reaction ±10%.
<Condensation Accelerator-Packed Bed>

Phosphorus has a boiling point of 280° C. and a melting point of 44° C., and generated high-temperature phosphorus (g) generally condenses as phosphorus (L) when cooled to the range of lower than 280° C. and 44° C. or higher. Thus, in the method for producing phosphorus of the invention, to recover the phosphorus vapor generated through the reduction reaction as phosphorus as liquid instead of a gas, a condensation accelerator-packed bed formed with the condensation accelerator described above is further provided as another packed bed in an area where the temperature gradually decreases from the high-temperature part at the outlet (downstream) side of the carbon material-packed bed for the reduction reaction. In the condensation accelerator-packed bed, by causing phosphorus vapor to flow through the voids (space) which are not filled with the condensation accelerator particles and increasing the frequency of the collision among the phosphorus vapor molecules or the collision of the phosphorus vapor molecules with the surface of the filling particles, the condensation of the phosphorus vapor is accelerated, and the phosphorus which has turned into liquid is allowed to flow down along the surface of the packed bed particles or the reaction tube wall. Because phosphorus as liquid does not dissolve in water, a container containing water is disposed under the reaction tube, and the phosphorus can be caused to flow down into the container and recovered.

The deposition accelerator-packed bed has a structure in which phosphorus vapor can be condensed and in which the condensed liquid can flow downstream of the reaction tube and is formed by filling the reaction tube with the deposition accelerator described above. In this regard, however, a part of the condensed phosphorus as liquid sometimes remains in the condensation accelerator-packed bed.

To prevent deposition of solid phosphorus in the condensation accelerator-packed bed, the length of the condensation accelerator-packed bed is preferably designed in such a manner that the temperature at the outlet (downstream) end becomes the melting point of phosphorus of 44° C. or higher. When phosphorus is in the supercooled state, the temperature at the outlet end is also preferably designed at the lower limit temperature at which phosphorus (g) substantially condenses or higher, namely the lower limit temperature at which phosphorus as liquid can be obtained without deposition of solid phosphorus in the deposition accelerator-packed bed or higher. Moreover, to maintain the flowability of phosphorus as liquid, the temperature at the outlet end is more preferably designed at 100° C. or higher. By designing the length of the condensation accelerator-packed bed as described above in such a manner that the temperature at the outlet end falls in a preferable range, while the condensation of phosphorus vapor is made efficient, the phenomenon that the ultrafine solid phosphorus particles are carried by the gas flow and pass through the condensation accelerator-packed bed as air dispersed particle system, namely so-called aerosol, can be prevented. It is difficult to recover a solid phosphorus particle group once the particles have turned into aerosol, and the yield of phosphorus decreases considerably. Thus, to recover the entire phosphorus vapor formed as phosphorus as liquid, it is required to adjust the temperature at the outlet (downstream) end of the condensation accelerator-packed bed, namely the length of the deposition accelerator-packed bed.

The length of the condensation accelerator-packed bed is affected not only by the temperature but also by the gas flow rate, the shape of the filling particles and the like in the packed bed. Regarding the condensation of phosphorus vapor, the condensation constants have been theoretically determined for the cases of a bed flow, turbulence and the like in a pipe having a simple shape such as cylinder and square, but the invention is not limited by the constants.

When gaseous phosphorus (g) and the packed bed particles (condensation accelerator) come into contact with each other efficiently in the condensation accelerator-packed bed and when the gaseous phosphorus (g) molecules collide with each other sufficiently in the microspace in the condensation accelerator-packed bed, the heat exchange between the gaseous phosphorus (g) and the particles in the condensation accelerator-packed bed progresses effectively. The same also applies to a generated gas other than phosphorus (g). Thus, the gas temperature around the outlet and the temperature of the packed bed particles are almost the same.

Therefore, by measuring and comparing the set temperature at the downstream side of the condensation accelerator-packed bed and the temperature of the discharged gas, an appropriate length of the condensation accelerator-packed bed can be set. Many equations for estimating heat conduction in a packed bed, such as the Colburn equation, have been reported, and the length of the condensation accelerator-packed bed can also be estimated using such an equation.

In the production method of the invention, a container holding water is also preferably disposed downstream of the condensation accelerator-packed bed.

Using the container holding water, the liquid phosphorus (L) condensed in the deposition accelerator-packed bed can be recovered, and unreacted phosphorus oxide discharged at the reduction rate adjusted by the length of the carbon material-packed bed or the like can be recovered as phosphoric acid.

<Suitable Production Device for Carrying out Phosphorus Production Method of Invention>

The method for producing phosphorus of the invention can be carried out by the production device below.

A device for producing phosphorus for obtaining liquid phosphorus (L) from a liquid phosphoric acid compound as a starting raw material by a flow reaction with a nonoxidizing gas flow, having a phosphoric acid compound-heating area for generating phosphorus oxide generated by heating the liquid phosphoric acid compound, a carbon material-packed bed area for reducing the phosphorus oxide generated in the phosphoric acid compound-heating area to form gaseous phosphorus (g) and a condensation accelerator-packed bed area for condensing the gaseous phosphorus (g) generated in the carbon material-packed bed area to generate liquid phosphorus (L) in this order from upstream to downstream.

The areas in the production device are generally held in one reaction tube.

As explained for the above method for producing phosphorus, the production device preferably has a form of continuously or discontinuously supplying the liquid phosphoric acid compound to the phosphoric acid compound-heating area to enable continuous production of phosphorus.

Moreover, a form in which the condensation of gaseous phosphorus (g) is substantially conducted in the condensation accelerator-packed bed area is preferable, and the form is also as described in the explanation of the above method for producing phosphorus.

For example, by regulating the flow rate of the gas generated through the reduction reaction or regulating the flow rate of the nonoxidizing gas to regulate the gas flow rate, the condensation of the gaseous phosphorus (g) can be substantially conducted in the condensation accelerator-packed bed area. In this case, the reduction reaction of the gas of phosphorus oxide in the carbon material-packed bed area is more preferably progressed at a specific reduction rate as described above. The device also preferably has a structure which can regulate the feeding of the phosphoric acid compound by adjusting the generated gas flow rate to fall in a certain regulation range and also preferably has a structure which can supply the carbon material to the carbon material-packed bed at each predetermined time depending on the amount of decrease in the carbon material in the carbon material-packed bed.

The production device preferably has a regulator which automatically regulates at least any one of dropping of the phosphoric acid compound or supply of the phosphoric acid compound-impregnated porous carrier, heating regulation of the supplied phosphoric acid compound, the volume of the gas generated through the reduction reaction and the recovery amount of liquid phosphorus.

The temperature regulation of the areas in the production device is as explained for the above method for producing phosphorus.

In this regard, the condensation accelerator-packed bed area is preferably cooled in a temperature range of 44° C. or higher and lower than 280° C. or in a temperature range in which phosphorus (g) substantially condenses to condense phosphorus (g) to obtain phosphorus (L) as liquid as described above. The temperature range in which phosphorus (g) substantially condenses means a temperature range in which phosphorus as liquid can be obtained without deposition of solid phosphorus in the deposition accelerator-packed bed when phosphorus is in the supercooled state.

The cooling means, the cooling rate and the like are not particularly restricted as long as phosphorus (g) can be condensed to obtain phosphorus (L) as liquid, and a general cooling method can be appropriately employed. For example, cooling can be conducted using at least any of gas (for example, air cooling using air), liquid (for example, water cooling using water) and solid or using a combination thereof. Moreover, the cooling rate is not particularly restricted, either. Of these, by cooling with low-temperature water vapor (spray), the efficiency of condensation of gaseous phosphorus (g) into liquid phosphorus (L) can be further improved.

EXAMPLES

Although the invention is explained in further detail based on Examples, the invention should not be construed as being limited by the Examples. The "room temperature" in the invention means 25° C. In the Examples below, "g" in "phosphorus (g)" means gas, and "g" in the other contexts means gram.

In the invention, a yield means the ratio of actually obtained yellow phosphorus to the total phosphorus in the raw material phosphoric acid compound which is roughly estimated from the material balance before and after the reaction.

Example 1: Phosphoric Acid Reduction in Horizontal Activated Carbon-Packed Bed Reactor Phosphoric acid was reduced with carbon using a horizontal electric furnace. A rough sketch of the device used in the experiment is shown in FIG. 5. A quartz reaction tube 1 (an inner diameter of 22 mm and a length of 120 cm) was disposed in a horizontal electric furnace (only heating areas $H_1$ and $H_2$ are illustrated) with an inclination of about 5 degrees in the direction from the gas inlet 2 to the outlet 3. As illustrated in FIG. 5, formed phosphorus L as liquid can be collected at the downstream end of the quartz reaction tube 1 due to the inclination of the quartz reaction tube 1. Both ends of the quartz reaction tube 1 are closed with rubber stoppers 4 (4a and 4b), and glass tubes 5 are inserted through the rubber stoppers. Argon gas is introduced into the quartz reaction tube 1 from the glass tube 5 inserted through the rubber stopper 4a, and the gas generated through the reaction is discharged from the glass tube 5 inserted through the rubber stopper 4b.

The horizontal electric furnace is composed of two heating areas, namely the $H_1$ area (15 cm) and the $H_2$ area (30 cm). The $H_1$ area is for the phosphoric acid compound-heating area A. The $H_2$ area is for the carbon material-packed bed area B for reducing the phosphorus oxide generated in the phosphoric acid compound-heating area A to form gaseous phosphorus (g). The temperatures of the heating areas $H_1$ and $H_2$ can be independently regulated.

As a carbon material-packed bed area B in the quartz reaction tube 1 and a condensation accelerator-packed bed area C disposed downstream of the area B, activated carbon (manufactured by Wako Pure Chemical Industries, Ltd.) was filled with a length of about 45 cm. As the phosphoric acid compound-heating area A before (upstream) the area B, phosphoric acid-containing (-impregnated) activated carbon obtained by soaking 10 g of phosphoric acid having water percentage of 15 mass % in 10 g of activated carbon was filled to a length of about 15 cm (the total phosphoric acid amount of 10 g).

The carbon material-packed bed area B of the quartz reaction tube 1 was disposed in the heating area $H_2$ of the horizontal furnace, and the phosphoric acid compound-heating area A was disposed in the heating area $H_1$ of the horizontal furnace. As a result, the deposition accelerator-packed bed area C having a length of 15 cm without temperature regulation was disposed downstream of the carbon material-packed bed area B (about 30 cm) of the quartz reaction tube 1, namely downstream of the horizontal electric furnace. According to the temperature measurement of the reactor, in the reaction for obtaining phosphorus below, the temperature of the area C at the interface with the area B was about 300° C., and the temperature around the outlet (downstream) of the area C was about 120° C.

In the area C outside the electric furnace (the condensation accelerator-packed bed area), formed gaseous phosphorus passes through the microspace among the carbon particles in the packed bed, which causes collision of phosphorus gas molecules or the like, and thus condensation is accelerated.

In the production method of the invention, gaseous phosphorus (g) is substantially condensed in the condensation accelerator-packed bed area C, but a very low volume of the gaseous phosphorus (g) does not condense in the condensation accelerator-packed bed area C and is discharged from the quartz reaction tube 1. The unrecovered phosphorus is in a very tiny amount which does not substantially affect the recovery rate of phosphorus and is in an amount of approximately around one thousandth of the recovery rate of phosphorus. The same applies to Examples 2 to 6.

The glass tube 5 at the gas outlet 3 side of the quartz reaction tube is connected to a flask filled with ion-exchanged water 7, and the discharged phosphorus (g) is recovered by bubbling the exhaust gas into water. A flask filled with bromine water 8 is connected next thereto, and the exhaust gas is bubbled, thereby completely removing yellow phosphorus. In this regard, the opening of the flask filled with the ion-exchanged water 7 was closed with a rubber stopper 4c, and the opening of the flask filled with the bromine water 8 was closed with a rubber stopper 4d. The gas was caused to flow through a glass tube 5 inserted through the rubber stoppers. The exhaust gas after the removal of yellow phosphorus is dehydrated through a dehydration tube filled with silica gel (not illustrated), and then the generated gas volume is measured every minute with a gas flow meter (not illustrated).

First, argon (Ar) was caused to flow into the quartz reaction tube 1 from the gas inlet 2 at a flow rate of 20 $cm^3$/minute, and the air in the system was replaced completely with Ar. Then, while Ar was caused to flow at the same gas supply rate, the temperature of the carbon material-packed bed area B filled with activated carbon was increased to 1000° C. Thereafter, Ar was caused to flow continuously at the same flow rate during the experiment. After maintaining the carbon material-packed bed area B at 1000° C. for 10 minutes, the temperature of the phosphoric acid compound-heating area A filled with 20 g of phosphoric acid-containing activated carbon (the total phosphoric acid amount of 10 g) was increased at a rate of 20° C./minute to around 300° C. and maintained for around 15 minutes. While the generated gas volume increased with the increase in the temperature of the phosphoric acid compound-heating area A, the temperature of the phosphoric acid compound-heating area A was manually increased gradually to 700° C. so that the total gas volume which was observed with a flow meter would become 200 $cm^3$/minute or less, and then the temperature was maintained. After the point at which the temperature of the phosphoric acid compound-heating area A reached 400° C., a gas at a higher flow rate than the flow rate of the introduced Ar gas (20 $cm^3$/minute) was generated, and the generated gas volume increased with the increase in the temperature of the phosphoric acid compound-heating area A. When the temperature of the phosphoric acid compound-heating area A reached 550° C., a transparent yellow liquid started to condense in the condensation accelerator-packed bed area C, and the liquid amount in the condensation accelerator-packed bed area C increased gradually with the increase in the temperature of the phosphoric acid compound-heating area A. Five hours after starting increasing the temperature of the phosphoric acid compound-heating area A, the electric furnace of the areas $H_1$ and $H_2$ was turned off, and the experiment was completed. The deposits on the wall which were found in PTL 3 were not observed. After the temperature of the electric furnace became room temperature, the liquid collected in the space between the area C and the rubber stopper 4b at the outlet side was recovered, weighed (1.8 g, a yield of 57%) and analyzed using Raman spectroscopy. As a result, the obtained liquid was identified as yellow phosphorus. The results of the Raman spectroscopy are shown in FIG. 6. Because the generated gas volume was not measured in Example 1, the yield was calculated from the recovered yellow phosphorus. It is known that yellow phosphorus remains in the carbon-packed bed in the production device after the reaction, and the yield is estimated to be 70% or more when the amount thereof is added.

Example 2: Phosphoric Acid Reduction in Vertical Activated Carbon-Packed Bed Reactor Phosphoric acid was reduced with carbon using a vertical electric furnace. A rough sketch of the device used in the experiment is shown in FIG. 7. The vertical electric furnace is composed of two heating areas $H_1$ and $H_2$ having a length of 30 cm in which the temperatures can be independently regulated. As illustrated in FIG. 7, the heating areas are for a phosphoric acid compound-heating area A in a quartz reaction tube 1 (an inner diameter of 32 mm and a length of 1200 mm) and a carbon material-packed bed area B for reducing the generated phosphorus oxide such as $P_4O_{10}$ with a carbon material. The upper end of the quartz reaction tube 1 is closed with a rubber stopper 4a through which a glass tube 5 is inserted, and argon gas is introduced from the glass tube 5 into the quartz reaction tube 1. To the lower end of the quartz reaction tube 1 disposed in the vertical electric furnace, a quartz tube 6 having an outer diameter of 8 mm is connected.

The carbon material-packed bed area B of the quartz reaction tube 1 and a condensation accelerator-packed bed area C positioned downstream of the area B were filled with activated carbon to a length of about 40 cm. The upper 30 cm of the 40-cm packed bed is in the heating area $H_2$, and the lower 10 cm is disposed outside the heating area $H_2$ as the deposition accelerator-packed bed area C without temperature regulation. The phosphoric acid compound-heating area A on the packed bed of the carbon material-packed bed area B for conducting the reduction reaction was filled with phosphoric acid-containing (-impregnated) activated carbon obtained by soaking 10 g of phosphoric acid having water percentage of 15 mass % in 10 g of activated carbon to a length of 15 cm. In FIG. 7, a space is illustrated between the phosphoric acid compound-heating area A and the carbon material-packed bed area B for easy understanding, but in practice, the two areas A and B are in contact with each other. According to the temperature measurement of the reactor, in the reaction for obtaining phosphorus below, the temperature of the area C at the interface with the area B was about 300° C., and the temperature around the outlet (downstream) of the area C was about 120° C.

To recover liquid phosphorus condensed in the area C, the quartz tube 6 at the lower end of the quartz reaction tube 1 inserted through a rubber stopper 4b was introduced to a flask filled with water 7. In the flask, by bubbling phosphorus element-containing discharged gas ($P_4O_{10}$ or the like) which could not be recovered as liquid phosphorus into the water 7 for cooling, unreduced $P_4O_{10}$ is recovered as phosphoric acid. By further bubbling the discharged gas from the flask filled with the water 7 into bromine water 8 through a glass tube 5 inserted through a rubber stopper 4c, phosphorus is removed completely. The exhaust gas after the removal of phosphorus is dehydrated through a dehydration tube 9 filled with silica gel, and then the flow rate of the generated gas (CO and hydrogen) is measured every minute with a gas flow meter 10.

First, Ar was caused to flow from the gas inlet 2 at an upper part of the quartz reaction tube 1 at a flow rate of 20 $cm^3$/minute, and the air in the system was replaced completely with Ar. Then, while Ar was caused to flow at the same gas supply rate, the carbon material-packed bed area B filled with activated carbon was heated to 1000° C. At the point at which the temperature of the area B reached 1000° C., the temperature of the phosphoric acid compound-heating area A filled with 20 g of phosphoric acid-containing activated carbon (the total phosphoric acid amount of 10 g) increased to around 300° C. After maintaining the state for 15 minutes, the temperature of the phosphoric acid compound-heating area A was increased at a rate of 10° C./minute. During the heating process, the temperature of the phosphoric acid compound-heating area A was gradually increased to 700° C. in a range in which the generated gas volume was 200 cc or less per minute. From the point at which the temperature of the area A reached 300° C., a gas at a slightly higher flow rate than the introduced Ar gas flow rate (20 $cm^3$/minute) was generated, and the generated gas volume increased with the increase in the temperature of the phosphoric acid compound-heating area A. At the point at which the temperature of the phosphoric acid compound-heating area A reached around 500° C., adhesion of droplets on the lower wall surface of the quartz reaction tube 1 was observed, and the droplets flowed down along the wall surface of the quartz reaction tube 1 and quartz tube 6, fell into the water 7 in the flask and condensed. After five hours from starting increasing the temperature of the phosphoric acid compound-heating area A, the electric furnace of the areas $H_1$ and $H_2$ was turned off, and the experiment was completed. After the temperature of the electric furnace became room temperature, phosphorus (L) collected in the flask was recovered, weighed (2.0 g, a yield of 63%) and identified as yellow phosphorus by analysis with Raman spectroscopy. The yield is based on the recovered yellow phosphorus amount. Although the accurate generated gas volume cannot be assessed because the generated gas volume measured with the flow meter was the volume per minute and varied in Example 2, the average reduction rate of phosphorus oxide calculated from the generated gas flow rate was 70% or more.

Example 3: Phosphoric Acid Reduction in Vertical Carbon Material-Packed Bed Reactor with Continuous Supply of Phosphoric Acid-Containing Activated Carbon The device and the method used in the Example are basically the same as those in Example 2 except for the points described below. The raw material phosphoric acid was supplied using a method of dropping a predetermined amount of phosphoric acid-containing (-impregnated) activated carbon (obtained using phosphoric acid having water percentage of about 15 mass % by adjusting the average weight ratio of phosphoric acid to activated carbon (phosphoric acid/carbon) to about 2.6) at each predetermined time on an upper part of the carbon material-packed bed. A rough sketch of the reaction system is shown in FIG. 8. In a vertical electric furnace, a quartz reaction tube 1 (an inner diameter of 32 mm and a length of 1200 mm) having a quartz tube 6 having an outer diameter of 8 mm at the lower end is disposed.

To charge phosphoric acid, a container 12 holding phosphoric acid-containing activated carbon (the phosphoric acid-containing activated carbon in the container is not illustrated) is connected to an upper part of the quartz reaction tube 1 through two valves 11 (11a and 11b). First, a predetermined amount of the activated carbon containing phosphoric acid is dropped to a space area 13 over the lower valve 11b by opening the upper valve 11a, and the upper valve 11a is closed. Then, the phosphoric acid-containing activated carbon is loaded to the phosphoric acid compound-heating area A by opening the lower valve 11b. The vertical electric furnace is composed of two heating areas $H_1$ and $H_2$ having a length of 30 cm in which temperatures can be independently regulated.

As illustrated in FIG. 8, the heating areas are for the phosphoric acid compound-heating area A for generating phosphorus oxide in the quartz reaction tube 1 and the carbon material-packed bed area B for reducing the generated phosphorus oxide such as $P_4O_{10}$ with a carbon material to form gaseous phosphorus (g). The phosphoric acid-containing carbon material-packed bed does not exist in the phosphoric acid compound-heating area A of the quartz reaction tube 1 before starting the experiment.

The carbon material-packed bed area B and the condensation accelerator-packed bed area C of the quartz reaction tube 1 were filled with activated carbon to a length of about 40 cm. The filling was conducted in such a manner that the upper 30 cm of the packed bed was within the carbon material-packed bed area B of the electric furnace and that the lower 10 cm was disposed outside the electric furnace and became an area without temperature regulation (an area corresponding to the condensation accelerator-packed bed area C). The recovery of phosphorus and the treatment system of the exhaust gas are similar to those of Example 2. According to the temperature measurement of the reactor, in the reaction for obtaining phosphorus below, the temperature of the area C at the interface with the area B was about 300° C., and the temperature around the outlet (downstream) of the area C was 120° C.

First, Ar was caused to flow from the gas inlet 2 at an upper part of the quartz reaction tube 1 at a flow rate of 20 cm³/minute, and the air in the system was replaced com- Examples 1 to 3 and commercial phosphorus samples were analyzed by ICP-AES emission spectroscopy (device manufactured by Shimadzu Corporation, type ICPS-8100), and the results shown in Table 2 were obtained (the unit of the values in Table 2 is ppm). In the table, the samples 1 to 3 correspond to the phosphorus samples obtained in Examples 1 to 3, respectively. As seen from Table 2, the impurity elemental components of the obtained phosphorus samples were almost the same as those of the commercial phosphorus samples.

As shown in Examples 1 to 3, it is seen that, by the production method of the invention, phosphorus having a high purity which is almost comparable to that of commercial phosphorus can be produced stably and quantitatively as liquid phosphorus (L).

TABLE 2

| | | Concentration/ppm | | | | | | | | | | | | |
|---|---|---|---|---|---|---|---|---|---|---|---|---|---|---|
| | Sample | Ca | Si | Fe | Al | Mg | Pb | Hg | As | Cd | Ni | Cr | Ti | Zn | Cu |
| Phosphorus of | 1 | 0.047 | 0.15 | 0.053 | 0.0012 | 0.007 | 0.32 | 0.063 | 0.32 | 0.019 | 0.12 | 0.03 | 0.02 | 0.02 | 0.031 |
| the Experiment | 2 | 0.048 | 0.092 | 0.036 | 0.001 | 0.0057 | 0.26 | 0.069 | 0.25 | 0.011 | 0.11 | 0.027 | 0.019 | 0.018 | 0.02 |
| | 3 | 0.024 | 0.084 | 0.036 | 0.0013 | 0.0038 | 0.24 | 0.08 | 0.39 | 0.017 | 0.13 | 0.025 | 0.02 | 0.014 | 0.021 |
| Nippon | 4 | 0.036 | 0.19 | 0.069 | 0.0012 | 0.004 | 0.16 | 0.1 | 0.33 | 0.024 | 0.12 | 0.03 | 0.024 | 0.016 | 0.023 |
| Phosphoric | 5 | 0.028 | 0.2 | 0.032 | 0.0012 | 0.0042 | 0.28 | 0.095 | 0.28 | 0.022 | 0.13 | 0.032 | 0.035 | 0.012 | 0.029 |
| Acid (commercial product) | 6 | 0.025 | 0.17 | 0.028 | 0.0008 | 0.004 | 0.21 | 0.08 | 0.29 | 0.018 | 0.19 | 0.023 | 0.019 | 0.01 | 0.031 |
| Mikuni | 7 | 0.04 | 0.14 | 0.033 | 0.0009 | 0.0067 | 0.3 | 0.12 | 0.41 | 0.027 | 0.22 | 0.03 | 0.013 | 0.014 | 0.029 |
| Pharmaceutical Industrial (commercial product) | 8 | 0.02 | 0.13 | 0.028 | 0.001 | 0.0033 | 0.27 | 0.068 | 0.27 | 0.021 | 0.19 | 0.026 | 0.019 | 0.016 | 0.022 |
| Ultrapure | 9 | 0.037 | 0.054 | 0.03 | 0.0012 | 0.0033 | 0.2 | 0.061 | 0.31 | 0.022 | 0.14 | 0.026 | 0.02 | 0.026 | 0.021 |
| Water | 10 | 0.048 | 0.1 | 0.028 | 0.0008 | 0.0034 | 0.26 | 0.079 | 0.25 | 0.018 | 0.16 | 0.034 | 0.019 | 0.021 | 0.028 | pletely with Ar. Then, while Ar was caused to flow at the same gas supply rate, the temperature of the carbon material-packed bed area B filled with activated carbon was increased to 900° C., and the temperature of the phosphoric acid compound-heating area A was increased to 700° C. The temperatures were maintained for 10 minutes. Then, the valve 11b was opened, and about 1 g of the phosphoric acid-containing activated carbon was fed into the phosphoric acid compound-heating area A on the carbon material-packed bed area B (activated carbon-packed bed) from the upper part of the quartz reaction tube 1. A gas was generated immediately after the feeding. The total discharged gas flow rate increased after the third feeding and reached around 150 cm³/minute. Then, while the flow meter (not illustrated) was observed, about 1 g of the phosphoric acid-containing activated carbon was newly fed at the point at which the generated gas volume decreased to 100 cm³/minute or less. Thereafter, the operation was repeated (the total phosphoric acid amount of 50 g). After thirty minutes from starting feeding the phosphoric acid-containing activated carbon, droplets adhered on the lower wall surface of the quartz reaction tube 1, and the combined droplets flowed down and condensed in the water 7 in the flask. After five hours from starting increasing the temperature of the phosphoric acid compound-heating area A, the power of H₁ and H₂ was turned off, and the experiment was completed. After the temperature of the electric furnace became room temperature, phosphorus (L) collected in the flask was recovered, weighed (12.5 g, a yield of 71%) and identified as yellow phosphorus by analysis with Raman spectroscopy.

According to a normal method, the impurity elemental components of the phosphorus samples obtained in Example 4: Phosphoric Acid Reduction with Drop-Supply of Dehydrated Phosphoric Acid Droplets to Vertical Carbon Material-Packed Bed Reactor The device and the method used in the Example were basically similar to those of Example 3 except for the system for supplying phosphoric acid described below. The raw material phosphoric acid compound was supplied using a method of dropping a predetermined amount of a phosphoric acid compound ($H_3PO_4$) as microdroplets from an upper part of the reaction tube at each predetermined time onto an upper part of the carbon material-packed bed.

A rough sketch of the reaction system is shown in FIG. 9. The vertical electric furnace is composed of a heating area $H_3$ having a length of 90 cm and a heating area $H_4$ having a length of 10 cm in which the temperatures can be independently regulated. As illustrated in FIG. 9, the heating areas are for a phosphoric acid compound droplet-heating area D in the quartz reaction tube 1 and a carbon material-packed bed area E. A gas inlet 2 for supplying argon gas is disposed at an upper part of the quartz reaction tube 1 separately from the charging hole of the phosphoric acid compound. The quartz reaction tube 1 (an inner diameter of 32 mm and a length of 1200 mm) having a quartz tube 6 having an outer diameter of 8 mm at the lower end is disposed in the vertical electric furnace. The quartz reaction tube 1 was filled with activated carbon to a length of 20 cm. The lower end of the activated carbon-packed bed 41 is positioned 10 cm outside the lower part of the heating area $H_4$, and thus an area without temperature regulation (an area corresponding to the condensation accelerator-packed bed area C) was disposed. According to the temperature measurement of the reactor, in the reaction for obtaining phosphorus below, the temperature of the area C at the interface with the area E was about 300° C., and the temperature around the outlet (downstream) of the area C was about 120° C.

As the raw material phosphoric acid compound, phosphoric acid ($H_3PO_4$) obtained by heating and dehydrating 85% phosphoric acid at 200° C. for 25 hours was used. The dehydrated phosphoric acid (also simply referred to as phosphoric acid in Example 4 below) 31 was supplied using a peristaltic pump P. A stainless steel pipe nozzle (having a tip cut at about 12°) S having an inner diameter of 0.6 mm×a length of 26 mm is attached to the end of a phosphoric acid-carrying silicon tube (an inner diameter of 2 mm×an outer diameter of 4 mm) used for the pump P, and droplets 33 of the phosphoric acid are dropped from the tip of the stainless steel pipe nozzle S to the upper surface of the carbon material-packed bed area E held in the quartz reaction tube 1 using the peristaltic pump P in such a manner that the droplets do not fall on the wall surface of the quartz reaction tube 1. The distance between the top of the activated carbon-packed bed 41 to the tip of the stainless steel pipe nozzle S dropping the droplets 33 is 300 cm. The dropping amount of the droplets 33 of the phosphoric acid was adjusted by the sending rate of the peristaltic pump P, and the droplets were fed in a manner that the supply amount per minute became a predetermined value. The volume of the gas generated through the reaction was continuously measured using a wet gas meter (a gas flow meter 10).

First, Ar was caused to flow from the gas inlet 2 at an upper part of the quartz reaction tube 1 at a flow rate of 20 $cm^3$/minute, and the air in the system was replaced completely with Ar. Then, while Ar is caused to flow at the same gas supply rate, the temperatures of the phosphoric acid compound droplet-heating area D and the activated carbon-packed bed area E are both increased to 1000° C., and the areas where the falling phosphoric acid droplets 33 pass through are heated. Then, the droplets 33 (the average volume of the droplets was 11 μl) of the phosphoric acid compound prepared above were fed from the tip of the micro-stainless steel pipe nozzle S fixed in a cap 23 on the top of the quartz reaction tube 1 at a dropping rate of about 0.4 g per minute to the upper part of the activated carbon-packed bed area E (gas reduction part) maintained at 1000° C. The droplets 33 were dropped over the reaction period of 60 minutes at a frequency of around about 30 times almost per minute. The amount of one droplet is around about 0.013 g. The total feed amount of the phosphoric acid compound 31 is 24.4 g. In the form of FIG. 9, the microdroplets 33 of the phosphoric acid compound fall on the upper surface (the upstream surface) of the carbon material-packed bed area E and then turn into phosphorus oxide on the surface.

The change in the gas generation volume with time after starting the experiment is shown in FIG. 10. A gas was generated immediately after starting dropping the droplets 33 of the phosphoric acid compound. After 10 minutes, the total discharged gas flow rate was 500 $cm^3$/minute or more, and then a gas of around about 600 $cm^3$/minute in the average was generated until 50 minutes later.

After fifteen minutes from starting dropping the droplets 33 of the phosphoric acid compound, adhesion of droplets on the lower (downstream of the area C) wall surface of the quartz reaction tube 1 was observed, and the combined droplets flowed down and condensed in the water 7 in a flask. The flask filled with the water 7 and the flask filled with bromine water 8 are disposed in a thermostat bath 21 set at 70° C. After an hour, the power of the heating areas $H_3$ and $H_4$ was turned off, and the experiment was completed. After the temperature of the electric furnace became room temperature, phosphorus (L) collected in the flask was recovered and weighed (6.12 g, a yield of 79.5%), and the recovered material was confirmed to be yellow phosphorus by analysis with Raman spectroscopy.

When the quartz reaction tube 1 after the completion of the reaction was observed, the height of the upper surface of the activated carbon-packed bed area E, which was an area responsible for the reduction reaction, lowered by about 5 cm. It is important in a packed bed-type reactor to progress the reaction at a specific reduction rate within the packed bed length range, and this shows that it is required to add a predetermined amount of carbon as the reducing agent continuously or intermittently for long-term continuous operation of the reduction reaction.

Example 5: Phosphoric Acid Reduction with Drop-Supply of Pyrophosphoric Acid Droplets to Vertical Carbon Material-Packed Bed Reactor The device and the method used in the Example are exactly the same as those in Example 4 except that pyrophosphoric acid was supplied as the raw material phosphoric acid compound. The raw material phosphoric acid compound was supplied using a method of dropping a predetermined amount of pyrophosphoric acid ($H_4P_2O_7$) as microdroplets 33 from an upper part of the reaction tube at each predetermined time onto an upper part of the activated carbon material-packed bed area E. As the raw material phosphoric acid compound, pyrophosphoric acid obtained by heating and dehydrating 85% phosphoric acid at 200° C. for 20 hours with vacuuming with a rotary pump was used. According to the temperature measurement of the reactor, in the reaction for obtaining phosphorus below, the temperature of the area C at the interface with the area E was about 300° C., and the temperature around the outlet (downstream) of the area C was about 120° C.

First, Ar was caused to flow from the gas inlet 2 at an upper part of the quartz reaction tube 1 at a flow rate of 20 $cm^3$/minute, and the air in the system was replaced completely with Ar. Then, while Ar was caused to flow at the same gas supply rate, the temperature of the activated carbon-packed bed area E was increased to 1000° C., and the temperature of the phosphoric acid compound droplet-heating area D was increased to 1000° C. The temperature was maintained for 30 minutes. Then, the droplets 33 (the average volume of the droplets was 12 μl) of the pyrophosphoric acid were fed from the tip of a micro-stainless steel pipe nozzle S fixed in a cap 23 on the top of the quartz reaction tube 1 at a dropping rate of about 0.35 g per minute to the upper part of the activated carbon-packed bed area E maintained at 1000° C. The droplets 33 were dropped over the reaction period of 60 minutes at a frequency of around about 25 times almost per minute. The total feed amount of the pyrophosphoric acid 31 is 21 g. The microdroplets 33 of the pyrophosphoric acid fall on the upper surface (upstream surface) of the carbon material-packed bed area E and then turn into phosphorus oxide on the surface.

The change in the gas generation with time after starting the experiment is shown in FIG. 11. A gas was generated immediately after starting dropping the pyrophosphoric acid droplets 33, and after 10 minutes, the total discharged gas flow rate became the flow rate achieved when 100% of the pyrophosphoric acid fed in a minute reacted. Then a gas at around about 450 cm$^3$/minute in the average was generated until 50 minutes later.

After ten minutes from starting dropping the pyrophosphoric acid droplets 33, adhesion of droplets on the lower (downstream of the area C) wall surface of the quartz reaction tube 1 was observed, and the combined droplets flown down and condensed in the water 7 in a flask. After an hour from starting increasing the temperature of the area D, the power of the heating areas H$_3$ and H$_4$ was turned off, and the experiment was completed. After the temperature of the electric furnace became room temperature, phosphorus (L) collected in the flask was recovered and weighed (3.64 g, a yield of 57%), and the recovered material was confirmed to be yellow phosphorus by analysis with Raman spectroscopy.

Compared to Example 4, in which droplets of dehydrated phosphoric acid were dropped, the recovery rate of phosphorus was lower in Example 5 using pyrophosphoric acid. This is because yellow phosphorus deposited also on the side wall of the glass tube inserted into the flask and could not be recovered. This is believed to be the reason for the yield of 57%. The yield is estimated to be 70% or more when the yellow phosphorus remaining on the side surface of the glass tube and in the carbon material-packed bed is added. From the results, it is seen that yellow phosphorus can be produced without problems when pyrophosphoric acid is used as a raw material similarly to dehydrated phosphoric acid.

As shown in Examples 4 and 5, it is seen that, by the production method of the invention, high-purity phosphorus can be continuously produced stably and quantitatively as liquid phosphorus (L).

Example 6

Phosphorus was produced in a similar manner as in Example 2 except that the leach solutions A to C shown in Table 1 above were used as the raw material instead of phosphoric acid having water percentage of about 15 mass %. As a result, it was confirmed that, also when crude phosphoric acid containing high amounts of impurities is used as the raw material, high-purity liquid phosphorus (L) can be obtained stably and quantitatively.

This application claims priority from patent application No. 2019-238375 filed on Dec. 27, 2019 in Japan, and the contents thereof are incorporated here by reference as a part of the description of the present specification.

REFERENCE SIGNS LIST

1. Quartz reaction tube
2. Gas inlet
3. Gas outlet
4 (4*a*, 4*b*, 4*c* and 4*d*). Rubber stopper
5. Glass tube
6. Quartz tube
7. Water (ion-exchanged water)
8. Bromine water
9. Dehydration tube
10. Gas flow meter
11 (11*a* and 11*b*). Valve
12. Phosphoric acid-containing activated carbon-holding container
13. Space area
21. Thermostat bath
23. Cap
31. Phosphoric acid compound as liquid

33. Droplet of phosphoric acid compound
41. Activated carbon-packed bed
A. Phosphorus oxide generation area (phosphoric acid compound-heating area) of activated carbon-packed bed
B. Reduction reaction area (carbon material-packed bed area for forming gaseous phosphorus (g)) of activated carbon-packed bed
C. Area outside electric furnace (condensation accelerator-packed bed area) of activated carbon-packed bed
D. Phosphoric acid compound droplet-heating area
E. Activated carbon-packed bed area (carbon material-packed bed area)
H$_1$. Heating area of electric furnace for A
H$_2$. Heating area of electric furnace for B
H$_3$. Heating area of electric furnace for D
H$_4$. Heating area of electric furnace for E
Ar. Argon gas
G. Generated gas
L. Phosphorus as liquid
X. Carbon material-packed bed
dV. Infinitely thin disc
P. Peristaltic pump
S. Stainless steel pipe nozzle

The invention claimed is:

1. A method for producing phosphorus, the method comprising:
   a reduction reaction for forming gaseous phosphorus (g) by bringing phosphorus oxide generated by heating a liquid phosphoric acid compound into contact with a carbon material, and
   a condensation of the gaseous phosphorus (g) into liquid phosphorus (L),
   wherein the reduction reaction of the phosphorus oxide and the condensation of the gaseous phosphorus (g) are conducted by a flow reaction with a nonoxidizing gas flow,
   wherein the reduction reaction of the phosphorus oxide is conducted in a carbon material-packed bed, and
   the condensation of the gaseous phosphorus (g) is substantially conducted in a condensation accelerator-packed bed which is disposed downstream of the carbon material-packed bed and in contact with the carbon material-packed bed.

2. The method for producing phosphorus according to claim 1, wherein the liquid phosphorus (L) is obtained by continuously supplying the liquid phosphoric acid compound.

3. The method for producing phosphorus according to claim 1, wherein the liquid phosphoric acid compound is supplied by providing a porous carrier containing the liquid phosphoric acid compound.

4. The method for producing phosphorus according to claim 1, wherein the liquid phosphoric acid compound is supplied dropwise.

5. The method for producing phosphorus according to claim 1, wherein the liquid phosphoric acid compound is heated to 200 to 1000° C. to generate the phosphorus oxide, and a reduction reaction temperature of the phosphorus oxide is 700 to 1200° C.

6. The method for producing phosphorus according to claim 1, wherein a condensation temperature in the condensation accelerator-packed bed is in a temperature range of 44° C. or higher and lower than 280° C. or in a temperature range in which the gaseous phosphorus (g) substantially condenses.

7. The method for producing phosphorus according to claim 1, wherein the liquid phosphoric acid compound contains at least one selected from the group consisting of crude phosphoric acid, crude condensed phosphoric acid and crude phosphorous acid.

8. The method for producing phosphorus according to claim 1, wherein a heating temperature of the liquid phosphoric acid compound and a reduction reaction temperature of the phosphorus oxide are independently regulated.

9. The method for producing phosphorus according to claim 1, wherein the reduction reaction of the phosphorus oxide is conducted in the carbon material-packed bed by regulating at least one of a heating temperature of the liquid phosphoric acid compound and a nonoxidizing gas flow rate based on a total discharged gas flow rate of carbon monoxide gas and hydrogen gas generated through the reduction reaction of the phosphorus oxide.

10. The method for producing phosphorus according to claim 1, wherein unreacted phosphorus oxide is recovered in a container holding water disposed downstream of the condensation accelerator-packed bed in the reduction reaction of the phosphorus oxide.

11. The method for producing phosphorus according to claim 1, wherein the carbon material is supplied to the carbon material-packed bed depending on an amount of decrease in the carbon material in the carbon material-packed bed due to the reduction reaction of the phosphorus oxide so as to maintain the height of carbon material-packed bed in the range of the height of the carbon material bed at the beginning of the reaction ±10%.

12. The method for producing phosphorus according to claim 1, wherein the liquid phosphorus (L) is obtained by discontinuously supplying the liquid phosphoric acid compound.

\*   \*   \*   \*   \*